(12) United States Patent
Odenwald

(10) Patent No.: US 6,996,629 B1
(45) Date of Patent: Feb. 7, 2006

(54) EMBEDDED INPUT/OUTPUT INTERFACE FAILOVER

(75) Inventor: Louis Odenwald, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 750 days.

(21) Appl. No.: 09/999,375

(22) Filed: Oct. 31, 2001

Related U.S. Application Data

(60) Provisional application No. 60/287,870, filed on Apr. 30, 2001.

(51) Int. Cl.
G06F 15/173 (2006.01)

(52) U.S. Cl. .................. 709/238; 709/239; 370/218; 370/225; 370/228

(58) Field of Classification Search ......... 709/239–245
See application file for complete search history.

(56) References Cited

U.S. PATENT DOCUMENTS 6,775,230 B1 * 8/2004 Watanabe et al. .......... 370/228
6,839,747 B1 * 1/2005 Blumenau et al. .......... 709/223

\* cited by examiner

Primary Examiner—Zarni Maung
Assistant Examiner—Glenford Madamba
(74) Attorney, Agent, or Firm—Suiter West Swantz PC LLO

(57) ABSTRACT

The present invention is directed to a system and method of providing an embedded input/output interface failover. An apparatus for providing an input/output interface with failover functionality between a host and a target may include a first data transfer route suitable for communicatively coupling the apparatus to a host system, a second data transfer route suitable for communicatively coupling the apparatus to a target, and a third data transfer route suitable for communicatively coupling the apparatus to the target. A memory suitable for storing electronic data is also included, the memory including a program of instructions. A controller is communicatively coupled to the first data transfer route, the second data transfer route, the third data transfer route and the memory. The controller is suitable for performing the program of instructions, wherein the program of instructions configures the controller to transfer data between the host and target utilizing the third data transfer route should the second data transfer route become unavailable.

24 Claims, 34 Drawing Sheets

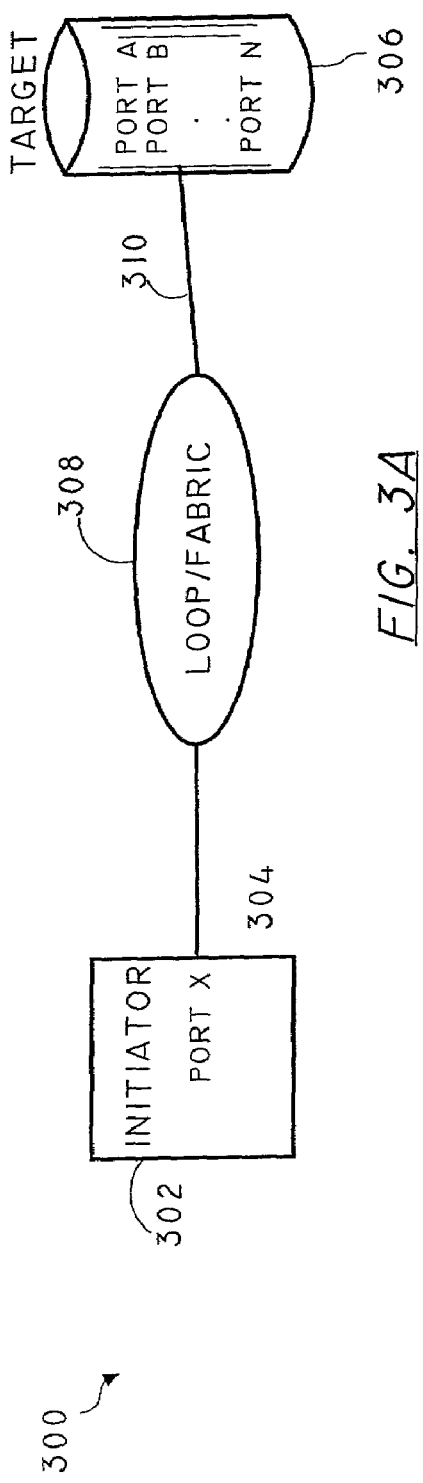
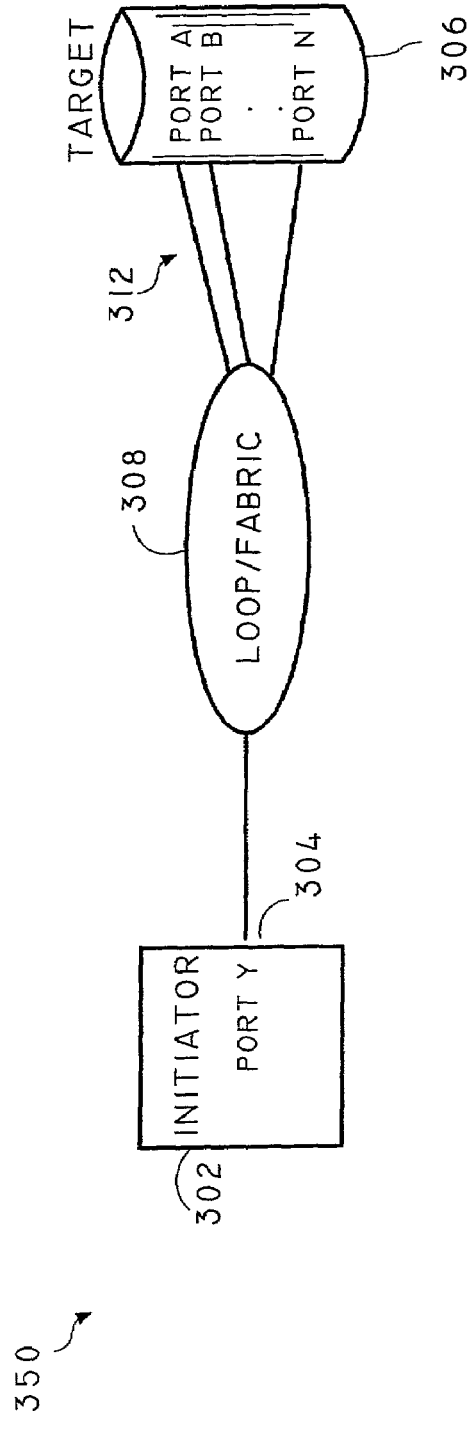
FIG. 3A
FIG. 3B

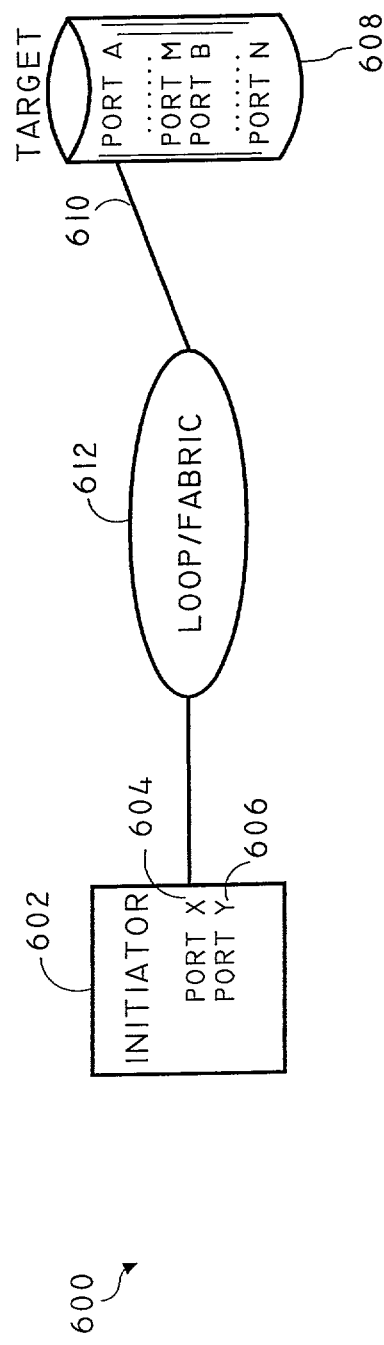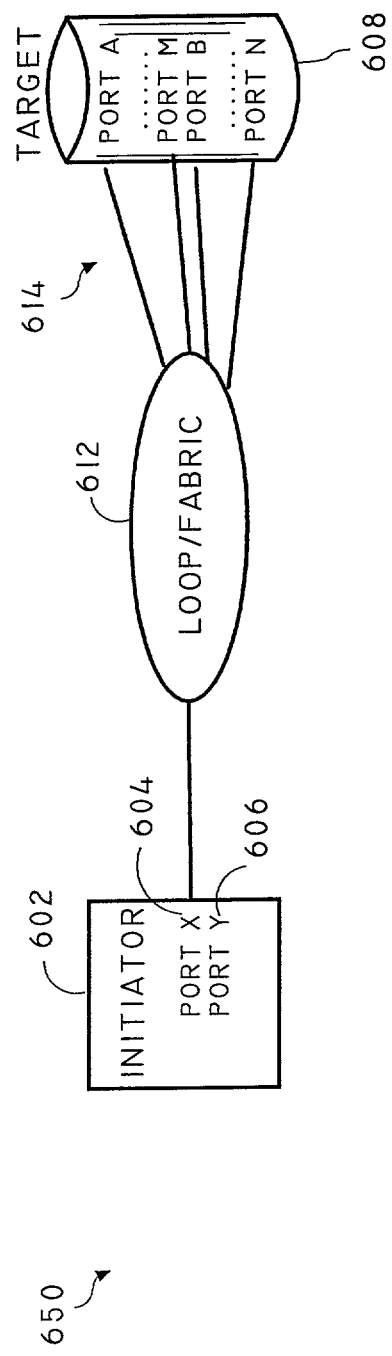

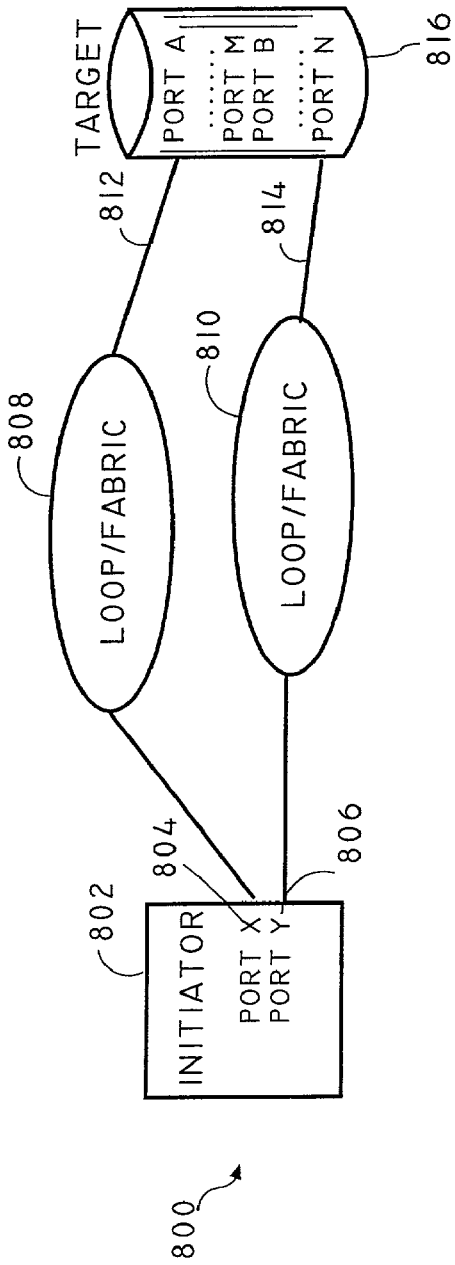
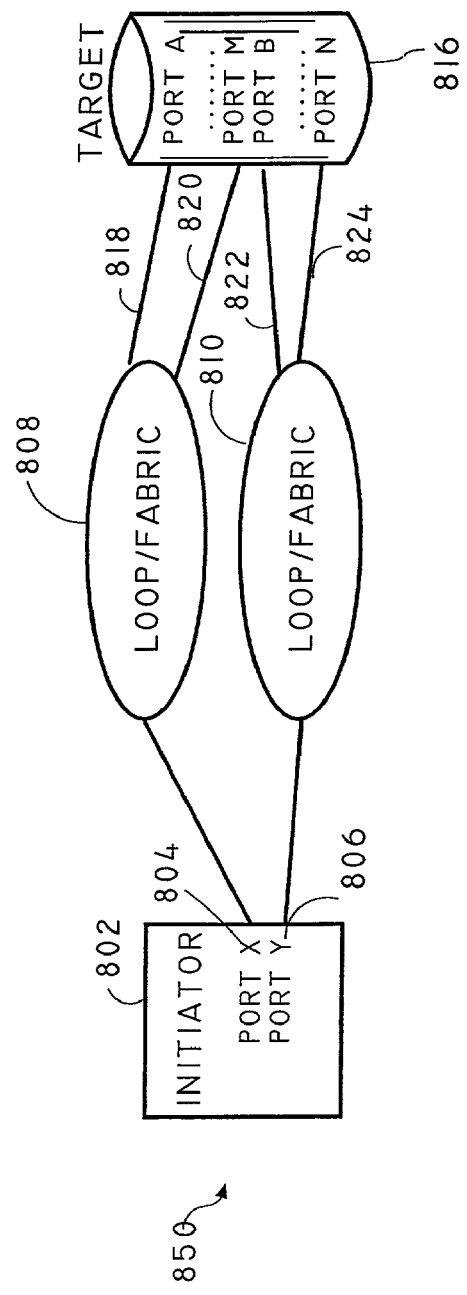
FIG. 8A
FIG. 8B

EMBEDDED INPUT/OUTPUT INTERFACE FAILOVER

CROSS REFERENCE TO RELATED APPLICATION

The present application claims priority under 35 U.S.C. § 119(e) to U.S. Provisional Application No. 60/287,870, filed Apr. 30, 2001, titled "Automatic Failover between Multiple Channels in a Fibre Channel Device," which is herein incorporated by reference in its entirety. The present application also incorporates U.S. patent application Ser. No. 09/467,461, filed Dec. 20, 1999, "Methodology for Providing Persistent Target Identification in a Fibre Channel Environment," U.S. Pat. No. 6,671,727, issued on Dec. 30, 2003, by reference in its entirety.

FIELD OF THE INVENTION

The present invention generally relates to the field of fibre channel devices, and particularly to an apparatus, system and method for enabling access and transfer of data with failover functionality.

BACKGROUND OF THE INVENTION

The access, transfer and storage of electronic data is one of the most important aspects of modern life. From business to personal use, electronic data is utilized to make lives easier, as information representing transactions, personal data, business, and the like is stored and transferred quickly and accurately. By communicatively linking systems, data may be transferred to provide this functionality.

To provide consistent and persistent access to data, a variety of paths to the data, as well as data saving schemes may be employed. However, these schemes may require high data bandwidth, may be resource intensive, and may be incompatible across a variety of architectures. Further, such methods may result in complications to future development of products, devices and systems.

Further, the scheme employed may vary greatly depending on the functionality of the connected system. For example, some systems, when presented with multiple paths to a storage device, or target, will view each path as representing a different target device, thereby causing great confusion and compatibility issues within the system. However, in other systems, a host, when presented with multiple paths, may determine how many target devices are actually represented and choose a path accordingly. Such a system, when presented with but a single path and/or reconciled target, may have such optimization ability through the system hindered.

Additionally, to provide data from target devices in previous systems, targets were connected in very basic configurations, such as point-to-point and cross-coupled. However, component or software unavailability of even a single server, target device, route, and the like may make data access and transfer impossible. Some systems utilized to address these problems involved extensive modification to host operating systems, target devices, and the like, thereby making the implementation of this functionality difficult if not impossible in pre-existing systems.

SUMMARY OF THE INVENTION

Accordingly, the present invention is directed to a system and method for input/output interface failover. In a first aspect of the present invention, an apparatus for providing an input/output interface with failover functionality between a host and a target includes a first data transfer route suitable for communicatively coupling the apparatus to a host system, a second data transfer route suitable for communicatively coupling the apparatus to a target, and a third data transfer route suitable for communicatively coupling the apparatus to the target. A memory suitable for storing electronic data is also included, the memory including a program of instructions. A controller is communicatively coupled to the first data transfer route, the second data transfer route, the third data transfer route and the memory. The controller is suitable for performing the program of instructions, wherein the program of instructions configures the controller to transfer data between the host and target utilizing the third data transfer route should the second data transfer route become unavailable.

In a second aspect of the present invention, a system including an input/output interface with failover functionality for communicatively coupling a host and a target includes a host having an input/output interface. The input/output interface includes a first data transfer route suitable for communicatively coupling the input/output interface to the host, a second data transfer route suitable for communicatively coupling the input/output interface to a target and a third data transfer route suitable for communicatively coupling the input/output interface to the target. The input/output interface also includes a memory suitable for storing electronic data is also included, the memory including a program of instructions. A controller is also included which is communicatively coupled to the first data transfer route, the second data transfer route, the third data transfer route and the memory. The controller is suitable for performing the program of instructions, wherein the program of instructions configures the controller to transfer data between the host and target utilizing the third data transfer route should the second data transfer route become unavailable.

In a third aspect of the present invention, a method for providing a failover function between a host and a target in a network environment by an input/output interface includes providing a logical identifier table by an input/output interface, the logical identifier table including at least one logical identifier, the logical identifier suitable for referencing at least one physical address identifier of a target. Communications are managed between the host and the target by the input/output interface. The communications occur over at least one of a first route and a second route of at least two routes communicatively coupling the input/output interface to the target so that the host transfers data utilizing the second route of the at least two routes should the first route of the at least two routes become unavailable.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 3A, 3B and 3C are illustrations of embodiments of the present invention wherein exemplary topologies contemplated by the present invention are shown;

FIGS. 6A and 6B depict embodiments of the present invention wherein multi-ported initiators communicatively coupled to a target are shown;

FIGS. 8A and 8B depict an embodiments of the present invention wherein multiple fabrics may be provided to connect an initiator to a target;

DETAILED DESCRIPTION OF THE INVENTION

Reference will now be made in detail to the presently preferred embodiments of the invention, examples of which are illustrated in the accompanying drawings.

Referring generally now to FIGS. 1A through 30, exemplary embodiment of the present invention are shown. To provide consistent and persistent access to data, a variety of paths to the data may be provided, data saving schemes employed and data addressing schemes developed. However, previous schemes required high data bandwidth, were resource intensive, and suffered from incompatibility across a variety of architectures. Further, such schemes were unable to resolve the need of some systems to view but a single path and/or target with other systems that may perform such reconciliation by itself. By utilizing the present invention, persistent access to data may be achieved to provide embedded multipathing, failover, load balancing, may be configured for support in a variety of environments, static and dynamic logical identifiers employed, and the like.

Figure 1B:
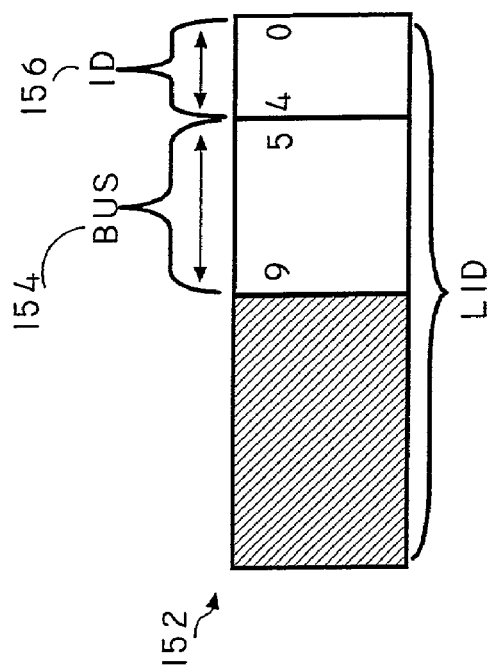
FIG. 1B is a depiction of an embodiment of the present invention wherein a dynamic logical identifier (LID) format is configured to provide logical mapping to a target.
Figure 1A:
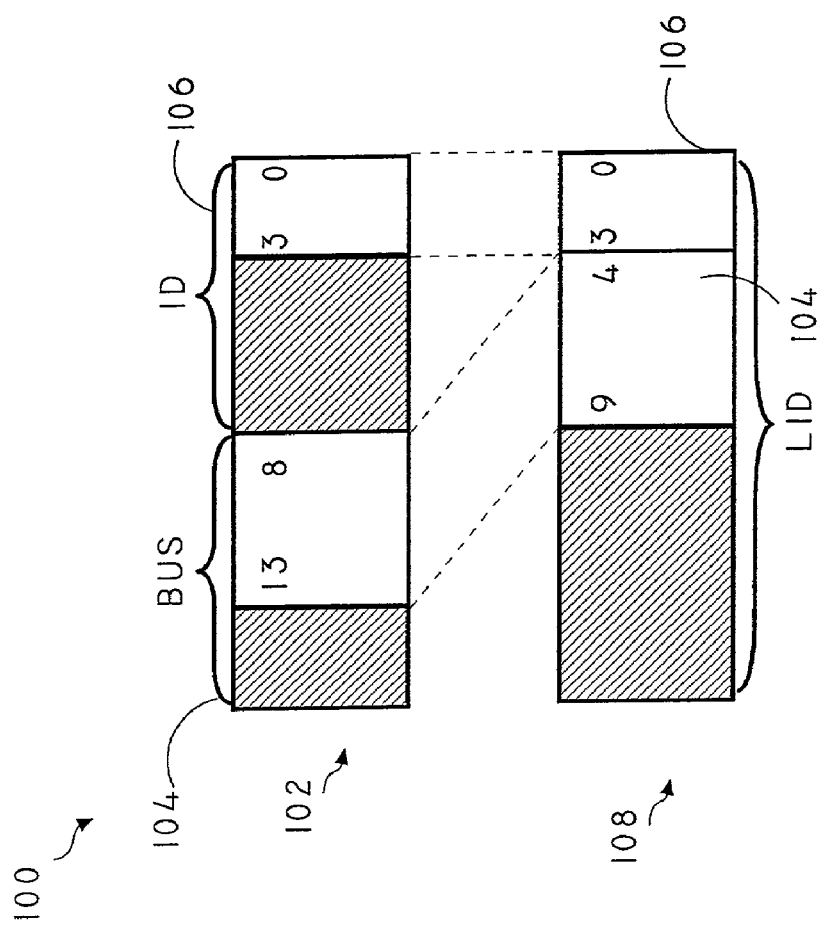
FIG. 1A is an illustration of an embodiment of the present invention wherein a logical identifier (LID) format is configured to provide static logical mapping to a target.

Referring now to FIG. 1A, an embodiment 100 of the present invention is shown wherein a logical identifier (LID) format is configured to provide static logical mapping to a target. A host, when providing an identifier 102, may include two 8-bit fields, a bus field 104 and an Id 106. An input/output controller (IOC), upon receiving the identifier 102, shifts the bus field 104 to create a logical identifier (LID) 108. The number of shifts is dependent upon the number of Ids per Bus the Host's OS supports. Thus, a linear 16-bit value suitable for indexing is provided which is less confusing to host driver developers, more efficient, and is compatible with a wide variety of bus formats, such as small computer system interface (SCSI) and the like.

Referring now to FIG. 1B, an embodiment 150 of the present invention is shown wherein a dynamic logical identifier (LID) format is configured to provide logical mapping to a target. A logical identifier 152 includes two variable sized fields, such as a bus field 154 and an ID field 156. Thus, a linear 16-bit value may be created which is suitable for indexing. The host and the IOC look at the same 16-bit value, just from two different perspectives. In this example, an input/output controller (IOC) does not need to be aware of the number of Ids per Bus the Host's OS supports. This option offers great scalability, and control over the number of buses and Ids support by the IOC.

Figure 1C:
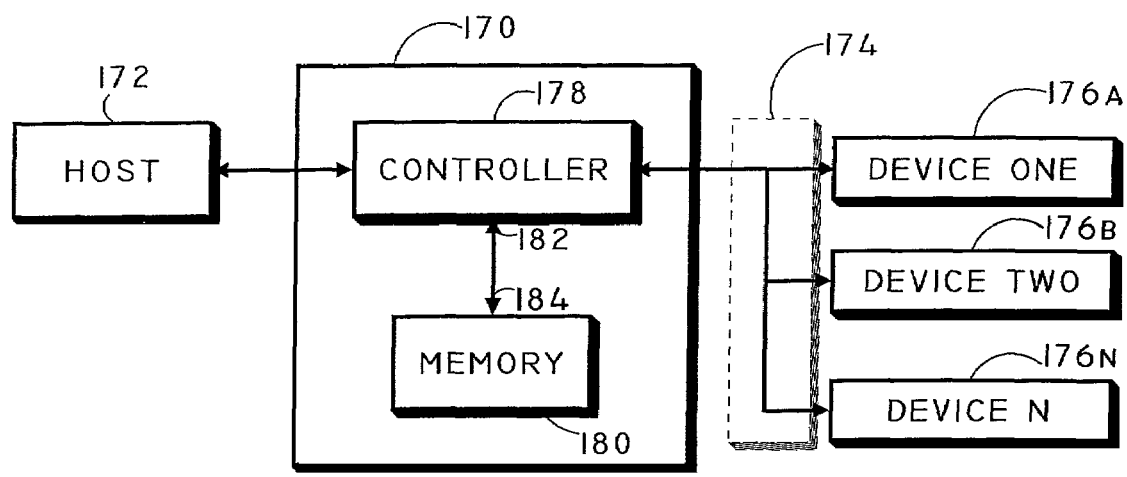
FIG. 1C is a block diagram illustrating an embodiment of the present invention wherein input/output interface is shown suitable for operation as an input/output interface employing logical identifiers.

Referring now to FIG. 1C, an embodiment of the present invention is depicted wherein a block diagram of an input/output interface 170 suitable for operation as an input/output interface employing logical identifiers of the present invention is shown. The input/output interface 170 may be, in one example, an FCP Initiator. The input/output interface 170 may be connected between a host 172 and a loop (or fabric) 174. The connections between the input/output interface 170 and the host 172 may be, in one example, a PCI or system bus. The loop 174 may be connected to one or more target devices 176a–176n. The host 172 may be, in one example, a microprocessor (e.g., a server). The target devices 176a–176n may be, in one example, other microcomputers or mass storage devices (e.g., hard drives, CD-ROM drives, zip-drives, etc.). However, the target devices 176a–176n may be implemented accordingly as other types of network devices. The input/output interface 170 may be configured to manage communications between the host 172 and the target devices 176a–176n.

The input/output interface 170 may comprise, in one example, a first circuit 178 and a second circuit 180. The first circuit 178 may be implemented, in one example, as a controller circuit. The second circuit 180 may comprise, in one example, a memory circuit. In one example, the second circuit 180 may comprise volatile and/or non-volatile memory. An input/output 182 of the first circuit 178 is generally connected to an input/output 184 of the second circuit 180. The first circuit 178 may be configured to store service parameters received from the target devices 176a–176n in the second circuit 180.

The input/output interface 170 may be configured to present a signal (e.g., a logical identification (LID)) to the host 172 for each FCP target device 176a–176n connected to the loop 174. The input/output interface 170 may be configured to associate an LID to a permanent unique identifier of each target device 176a–176n. The permanent unique identifier may be, in one example, a World Wide Node Name (e.g., WWNN) of the target devices 176a–176n. However, other permanent identifiers that are unique world wide (e.g., a World Wide Port Name) may be used. The input/output interface 170 may be configured to maintain the associations between LIDs and permanent identifiers such that dynamic physical address identifiers may change value without loss of association to a particular LID.

The input/output interface 170 may be further configured to associate the LID of each of the target devices 176a–176n to a physical address identifier of each of the target devices 176a–176n. The physical address identifier may be, in one example, an arbitrated loop physical address (AL_PA) or a D_ID.

The input/output interface 170 may be configured, in one example, to hard map the WWNs and physical address identifiers of the target devices 176a–176n. During a target discovery phase following power up, the input/output interface 170 may interrogate the loop (fabric) 174 to determine the connected targets 176a–176n. The targets 176a–176n may respond by sending frames of information (e.g., service parameters). The frames will generally have a header that may contain the physical address identifier of the sending target. The service parameters sent as part of the response frame will generally include the WWN of the sending target.

The input/output interface 170 may be configured, in one example, to generate a sorted list of the received WWNs according to predetermined criteria (e.g., ascending order), may utilize the formats shown in FIGS. 1A and 1B, and the like. The input/output interface 170 may generate associations between the WWNs and the corresponding physical address identifiers (e.g., memory pointers linking a WWN and a physical address identifier of a particular target and vice versa).

The input/output interface 170 may be further configured to assign a LID to each WWN according to predetermine criteria (e.g., position in the sorted list) and generate associations between each assigned LID and a physical address identifier (e.g., memory pointers linking a LID to a physical address identifier and vice versa) using the associations between (i) LIDs and WWNs and (ii) WWNs and physical address identifiers. The WWNs of the 176a–176n devices are permanent and unique throughout the world. Since the associations are referenced to the WWNs of the target devices 176a–176n, changes in the physical address identifiers of the target devices 176a–176n will generally not affect the associations.

For example, if a target device is physically moved, the target may send a frame of information announcing the physical change. The frame will generally contain a new physical address identifier in the header and the WWN of the target in the information of the frame. The input/output interface 170 may use the new physical address identifier to update the physical address identifier currently associated with the WWN that was contained in the frame. Since a particular LID and WWN are generally associated with the same physical address identifier, updating the physical address identifier associated with a particular WWN generally has the effect of maintaining the association between a LID and a particular device in a manner that is generally independent of the physical address of the device.

Figure 2A:
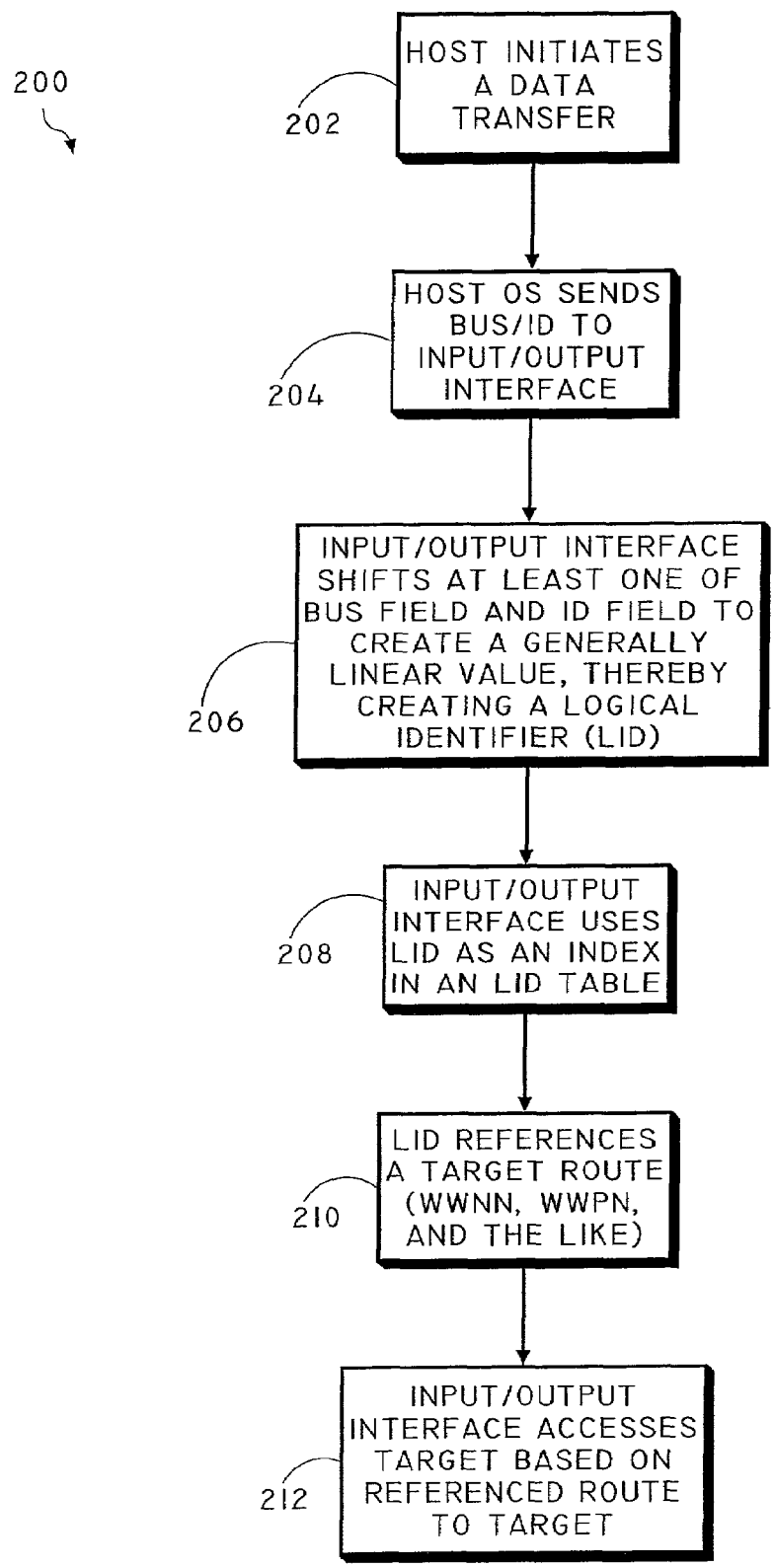
FIG. 2A is a flow diagram illustrating an exemplary method of the present invention wherein a static logical identifier is employed to provide a data transfer.

Referring now to FIG. 2A, an exemplary method 200 of the present invention is shown wherein a static logical identifier is employed to provide a data transfer. A host initiates a data transfer 202. The host operating system sends a bus/id to an input/output interface 204. The input/output interface, such as through the use of an input/output interface controller, shifts at least one of the bus field and ID field to create a generally linear value, and thereby creating a logical identifier (LID) 206. Input/output interface uses LID as an index in an LID table 208, and thus, the LID references a target route 210, such as a world wide node name, world wide port name, and the like. Therefore, the input/output interface may access the target based on referenced route to the target 212.

Figure 2B:
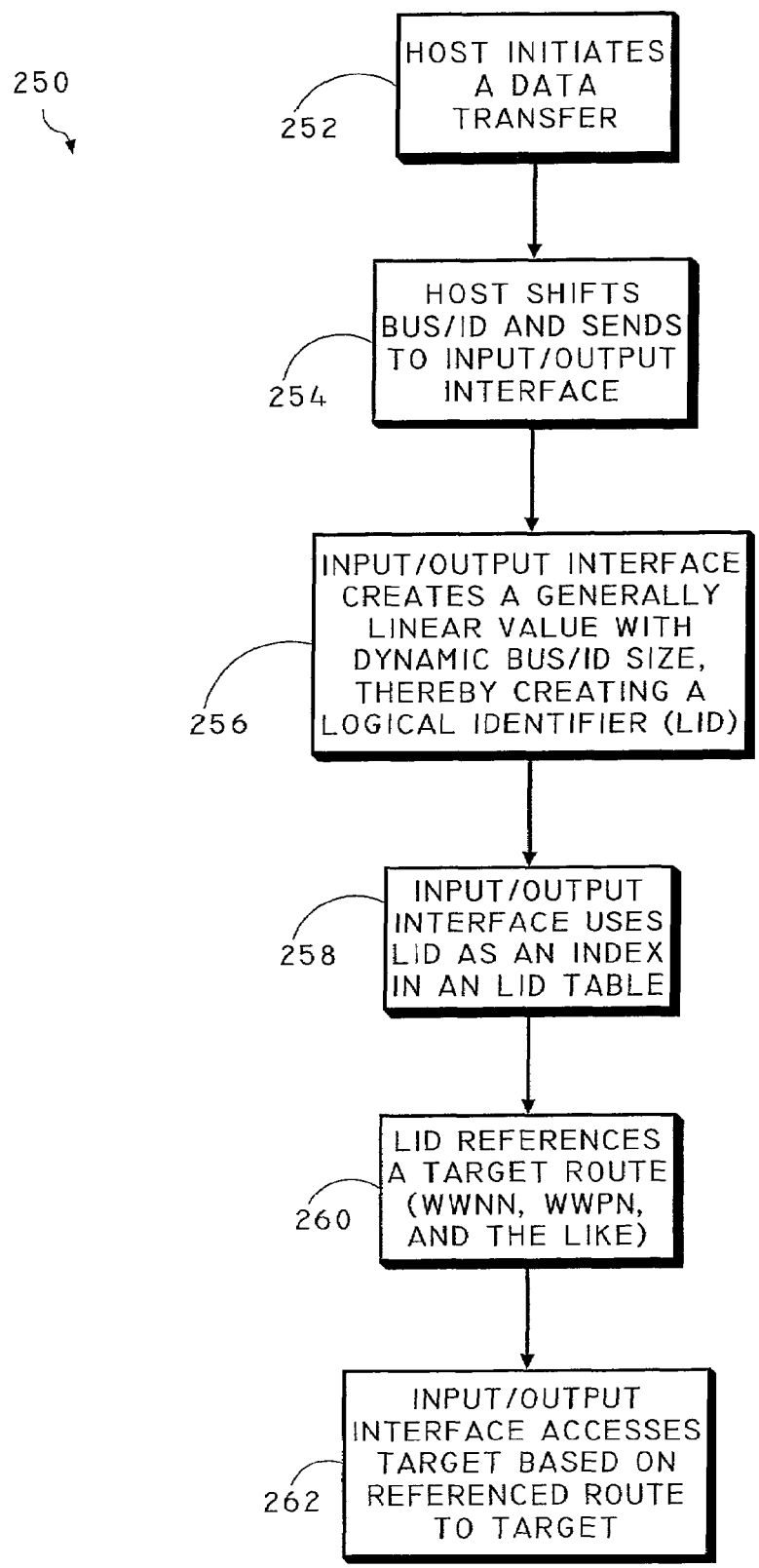
FIG. 2B is a flow diagram depicting an exemplary method of the present invention wherein a dynamic logical identifier is employed to provide a data transfer.

Referring now to FIG. 2B, an exemplary method 250 of the present invention is shown wherein a dynamic logical identifier is employed to provide a data transfer. A host initiates a data transfer 252 by sending a bus/id to an input output interface 254. The host shifts at least one of the bus field and ID field to create a generally linear value, and thereby creating a logical identifier (LID) 256. The input/output interface uses the LID as an index in an LID table 258. The LID references a target route 260, and thus, may provide a host with access to a target based on the referenced route 262.

Referring generally now to FIGS. 3A through 17, exemplary embodiments 300 & 350 of the present invention are shown in which a logical identifier (LID) is utilized in the accordance with the present invention to provide data transfer. As discussed previously, a logical identifier may be utilized to provide logical mapping to a target, and may be utilized in a variety of formats, such as the formats shown in FIGS. 1A and 1B. The logical identifier may map to a target's world wide node name, world wide port name, route to target, and the like, in message passing interface (MPI) environments, and other addressing schemes as contemplated by a person of ordinary skill in the art.

For example referring now to FIGS. 3A and 3B, exemplary topologies 300 & 350 contemplated by the present invention are shown. An initiator 302, such as an input/output interface included in a host and the like, has a single port 304 that is connected to a target 306 over a loop/fabric connection 308. A fabric connection is employed to communicatively couple the initiator 302 to the target 306. The fabric connection may provide scalability by not limiting the number of host interfaces and drive interfaces. To employ this increased functionality, the fabric may utilize messages, which in this instance are defined as a logical unit of work, to execute transfers.

Messages may be further segmented into packets. Data packets are an end-to-end fabric unit of transfer, e.g. packets are the routable unit of transfer. Hardware of the present invention may provide automatic message segmentation and re-assembly via packets. Packets include headers to identify the packet destination and the desired data and described above. To ensure packet delivery within a fabric, a switch may be provided within the fabric 308. For instance, the switch may operate as a packet-switching element within a fabric subnet, between systems, and the like.

In the examples shown in FIGS. 3A and 3B, single ported 304 initiators 302 are shown. In FIG. 3A, the target 306 is accessible over the fabric 308 by a connection 310 to a single port. Whereas, in FIG. 3B, the target 306 is accessible over the fabric 308 by multiple connections 312 to the target 306. Thus, through use of a logical identifier in a system of the present invention, the logical identifier may be utilized to enable data transfer in both instances.

Figure 3C:
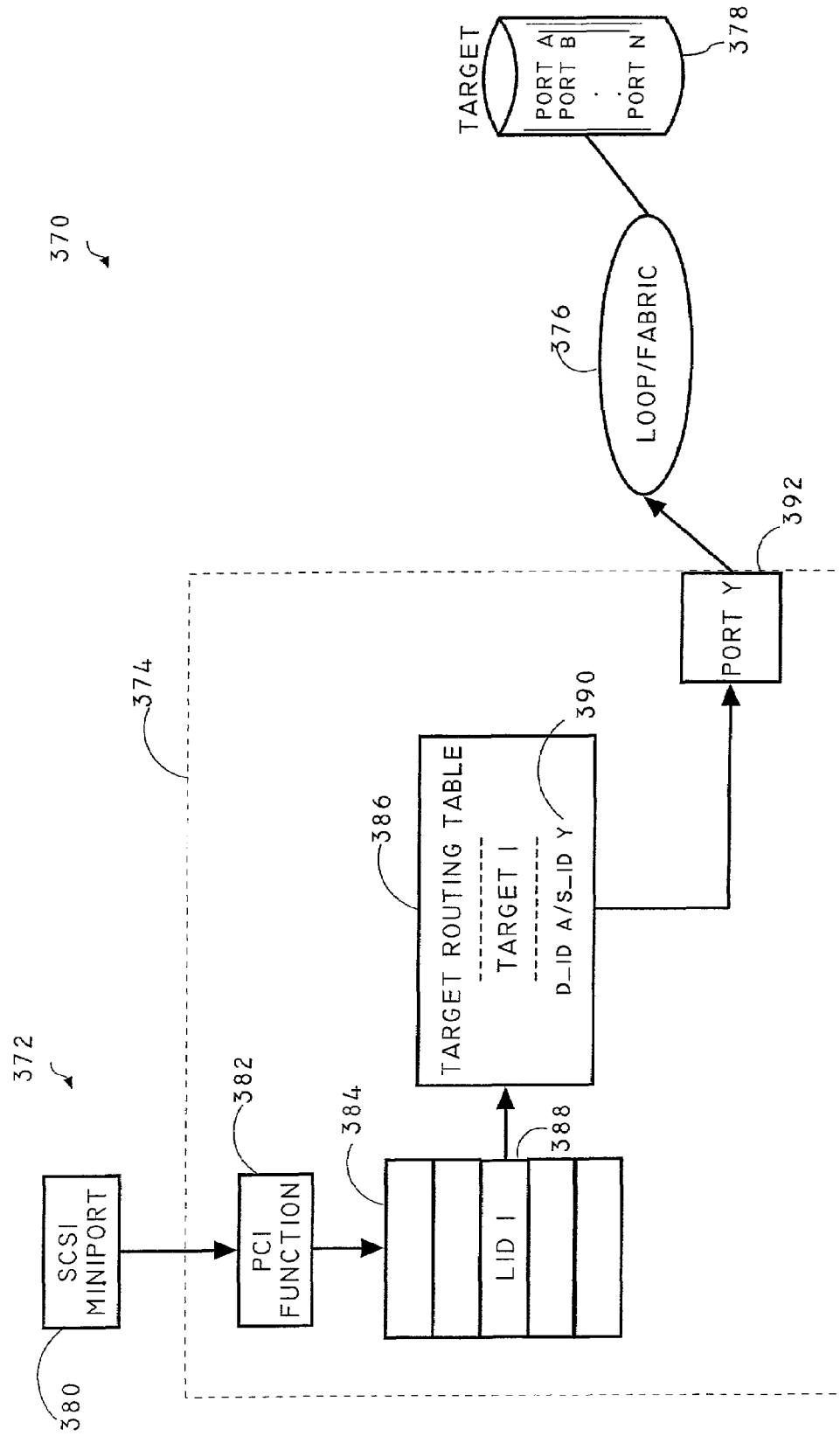

Referring now to FIG. 3C, an embodiment 370 of the present invention is shown wherein a single ported initiator is connected to a single port on a target. A host 372, such as a host and the like, includes an input/output interface 374 for communicatively coupling the host 372 over a loop/fabric 376 to a target 378, such as an electronic data storage device, which may include a RAID array, hard disk drive, and like data storage system.

The input/output interface 374 is connected to an interface of the host, such as a SCSI miniport 380, through an internal PCI interface 382. The input/output interface 374 further includes a logical identifier table 384, which, when used in conjunction with a target routing table 386 is suitable for describing a data transfer route between the host 372 and the target 378. The LID 388 of the logical identifier table 384 is referenced in conjunction with the target routing table 386 to indicate a path 390 to the target 378, such as through port Y 392. For instance, the logical identifier table 384 may be configured as a linear array, with LIDs as elements in the array, which point to an object 390 in the target routing table 386, such as world wide node name, to access the target 378. Thus, the host may access the target 378 through the use of a logical identifier of the present invention, with only one LID being presented to the host. Additionally, a single LID may be utilized to access a target through multiple ports.

Figure 4:
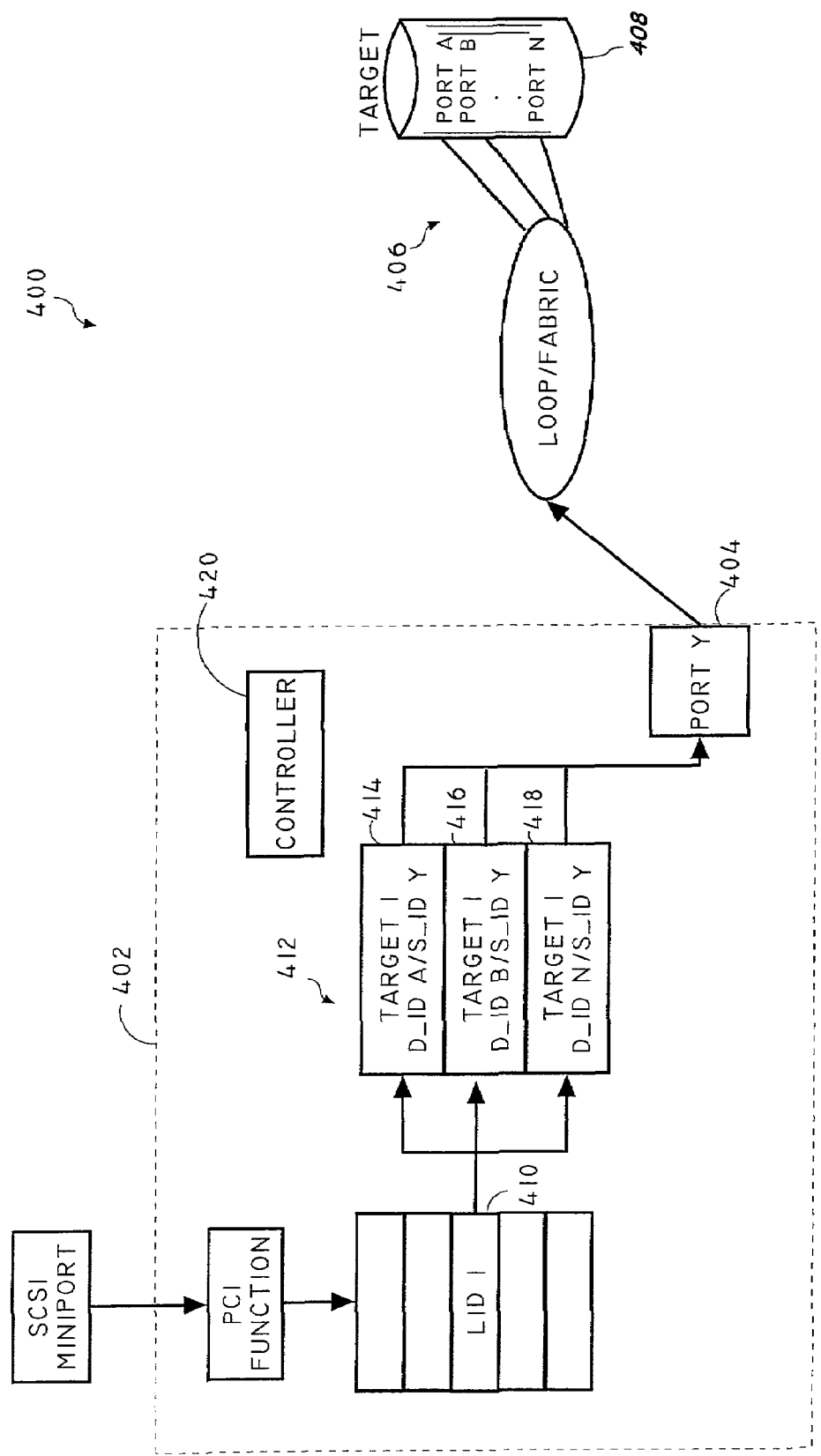
FIG. 4 is an illustration of an embodiment of the present invention wherein a single ported initiator not having dynamic multipathing filter (DMP) functionality is communicatively coupled to multiple ports on a target using a logical identifier.

For example, referring now to FIG. 4, an embodiment 400 of the present invention is shown wherein a single ported initiator not having dynamic multipathing filter (DMP) functionality is communicatively coupled to multiple ports on a target using a logical identifier. A host, including an input/output interface 402 configured with a single port 404, is coupled to multiple ports 406 of a target 408. In this instance, the host does not have dynamic multipathing filter (DMP) functionality, and thus, would view each path to a target as a separate target.

Thus, to provide a connection to the host without having the connection appear as multiple targets, the input/output interface 402 maps a single LID 410 to the target 408, such as a node and the like, thereby presenting only one LID to the Host. However, since there are multiple paths to the target, as shown by the multiple entries 414, 416 & 418 in target routing table 412, the input/output interface may determine a route, such as through the use of an included controller 420 implementing logic for route selection. For example, the controller may select a route from a target routing table to provide a route between the host and the target. In this way, a single route is presented to the host, with the input/output interface 402 making the routing decisions in a manner invisible to the host.

Figure 5:
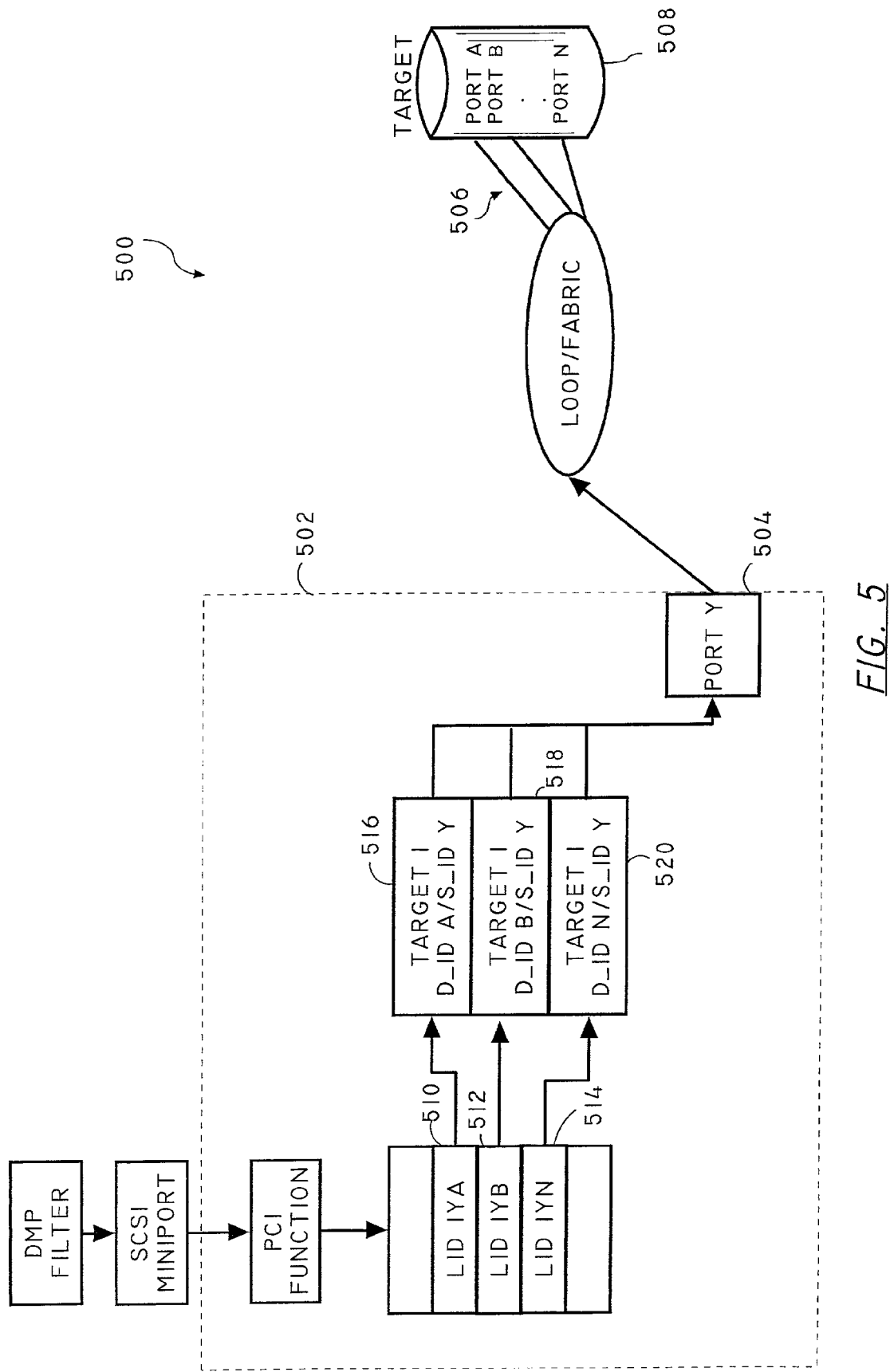
FIG. 5 is an illustration of an embodiment of the present invention wherein a single ported initiator having dynamic multipathing filter (DMP) functionality is communicatively coupled to multiple ports on a target using a logical identifier.

Referring now to FIG. 5, an embodiment 500 of the present invention is shown wherein a single ported initiator having dynamic multipathing filter (DMP) functionality disabled. Like the previous example, a host, including an input/output interface 502 configured with a single port 504, is coupled to multiple ports 506 of a target 508. In this instance, the host has dynamic multipathing filter (DMP) functionality, and thus, would not view each path to a target as a separate target. Therefore, the input/output interface has the dynamic multipathing functionality disabled to enable the host to make the routing decisions.

Thus, the input/output interface 502 maps a LID 510, 512 & 514 to every available path 516, 518 & 520 between the host and the target 508. For example, in a fibre channel implementation, the LID will map to an established N_Port Login and Process Login established between the initiator and target ports. For instance, in FCP, targets are discovered by initiators through a process called Target Discovery, which includes N_Port Login (PLOGI) and Process Login (PRLI). PLOGI trades service parameters, WWNs and Port Ids (P_Ids) between ports. PRLI advertises whether a port is functioning as an FCP Initiator or FCP Target, or both. Target routing table entries may store this accumulated information. Thus, multiple LIDs may be presented to the host for each target, and it is the responsibility of the host through the DMP functionality to make all routing decisions.

Multiple initiator ports are also contemplated by the present invention. Previously, the provision of multiple ports on an initiator further complicated data transfer. For example, as shown in the embodiment 600 depicted in FIG. 6A, an initiator 602 may include a multiple ports, such as a first port 604 and a second port 606 for connecting to a single port 610 of a target 608 over a fabric connection 612. The initiator 602 is communicatively coupled to the target 608 utilizing the first port 604. Likewise, as shown in the embodiment 650 depicted in FIG. 6B, an initiator 602 may include multiple ports 604 and 606, and be communicatively coupled to the target 608, the target having multiple connections 614 to the fabric 612. By utilizing the present invention, a logical identifier is suitable for describing both single and multiple ports of a target as connected to a fabric, and may do so in a manner so as to present the information to a host without causing target determination problems. For example, an LID may be used in conjunction with a target routing table to perform data transfers.

Figure 7A:
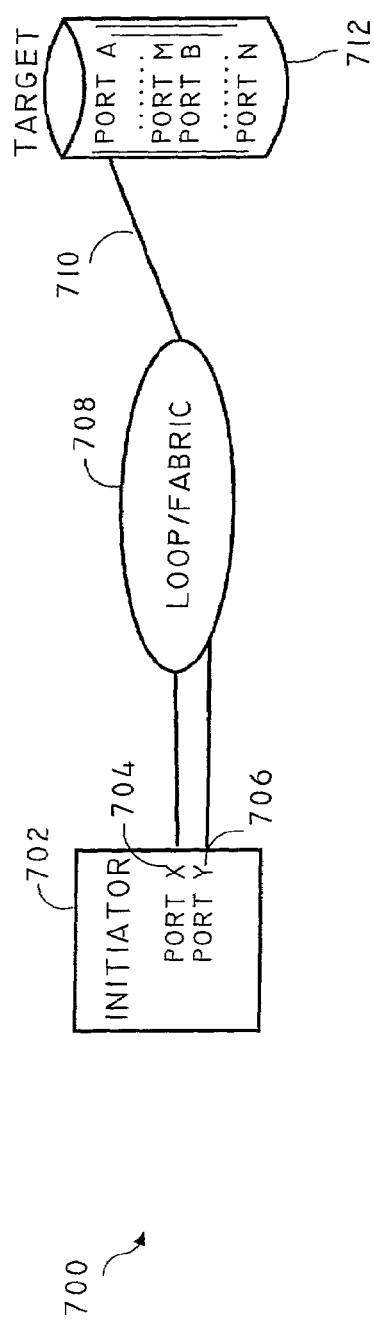
FIGS. 7A and 7B are illustrations of embodiments of the present invention wherein multi-ported initiators communicatively coupled to a target utilizing the multiple ports is shown.
Figure 7B:
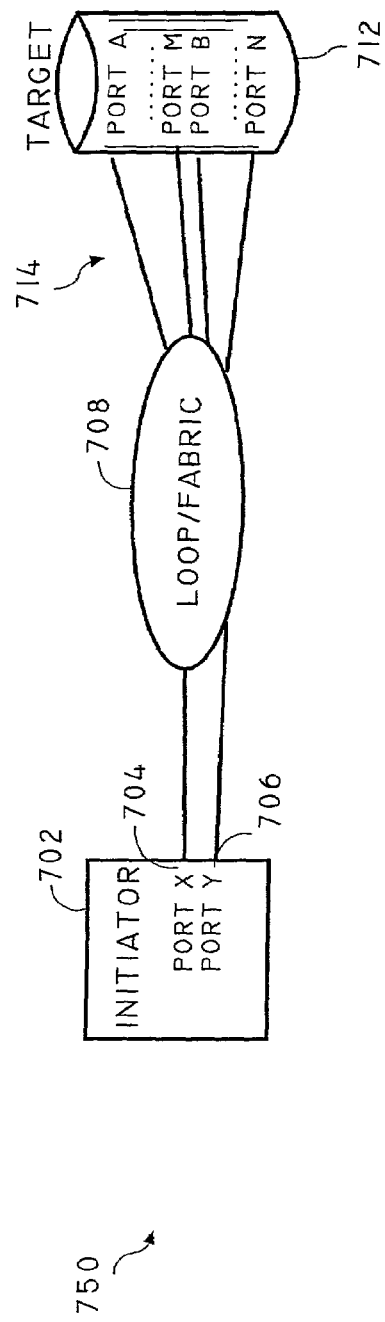

Additionally, as shown in the embodiments 700 and 750 depicted in FIGS. 7A and 7B, an initiator may be communicatively coupled to a fabric utilizing multiple ports. For example, in FIG. 7A, an initiator 702 including a first port 704 and a second port 706 is communicatively coupled to a fabric 708 to access a single port 710 of a target 712. Additionally, as shown in the embodiment 750 depicted in FIG. 7B, an initiator 702 may utilize a plurality of ports 704 and 706 to access a target 712, the target having multiple connections 714 to a fabric 708. Therefore, the logical identifier should also provide access to multiple ports of the initiating device, as well as multiple connections of a target to a fabric.

Further, multiple fabrics may be provided to connect an initiator to a target, as shown in the embodiments 800 & 850 illustrated in FIGS. 8A and 8B. In FIG. 8A, an initiator 802 includes a first port 804 and a second port 806. Each port 804 & 806 is connected to a separate fabric, such as a first fabric 808 and a second fabric 810. The target 816 likewise has multiple ports 812 & 814 connecting the target 816 to the fabrics 808 & 810. In this way, communication is provided between the initiator 802 and the target 816 utilizing multiple ports of both the target 812 & 814 and the initiator 804 & 806. Further, each respective fabric 808 & 810 may provide multiple connections 818, 820, 822 & 824 to a target 816, as shown in FIG. 8B.

Thus, the present invention preferably provides a system and method that accounts both for multiple ports, fabrics, connections by a target to a fabric, and the like. Moreover, the present invention provides an integrated system and method that may be employed by hosts employing DMP functionality as well as for hosts that do not have such functionality.

Figure 9:
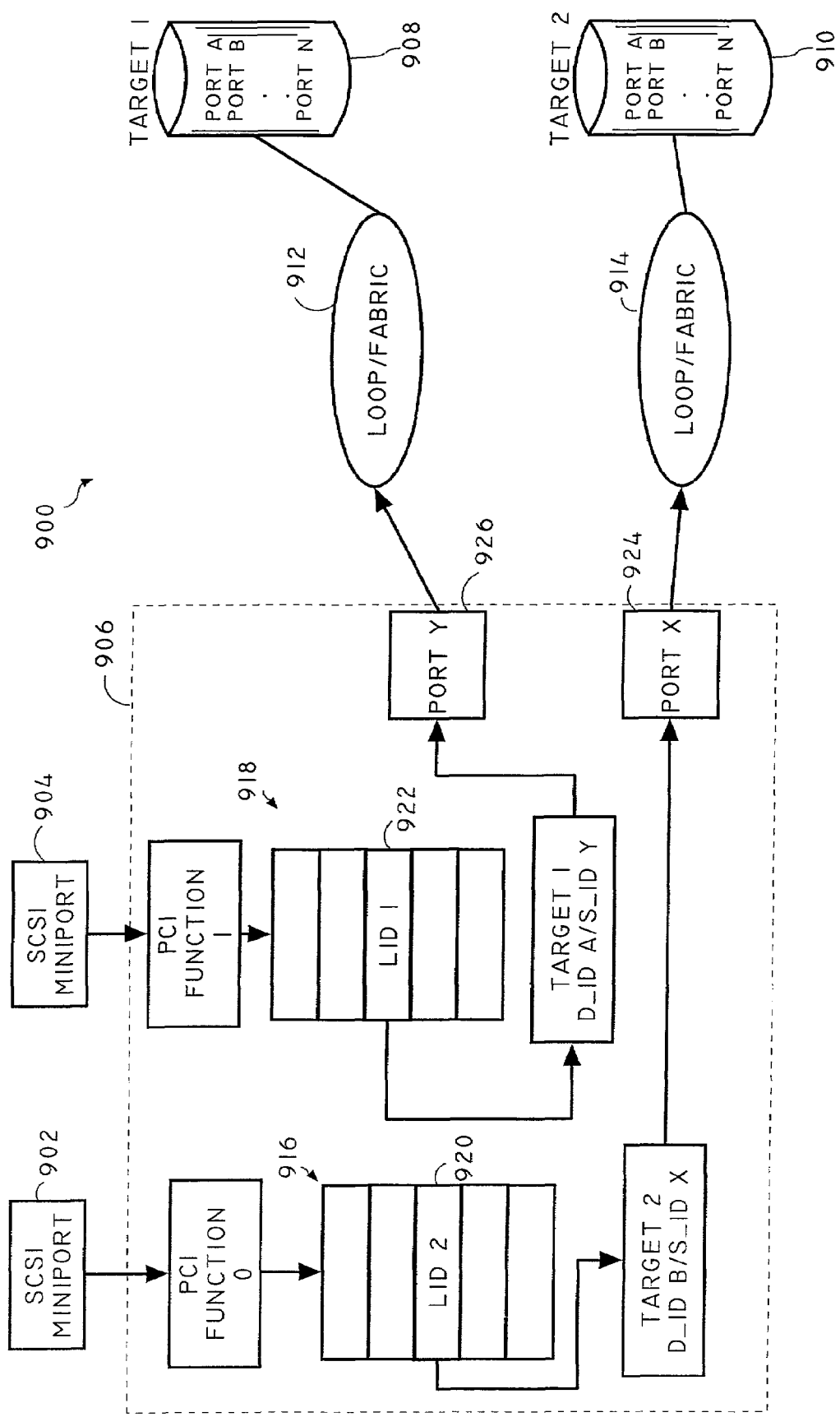
FIG. 9 is a diagram of an embodiment of the present invention wherein a dual ported initiator is connected to independent fabrics for accessing at least one target over the respective fabric.

Referring now to FIG. 9, an embodiment 900 of the present invention is shown wherein a dual ported initiator is connected to independent fabrics for accessing at least one target over the respective fabric. A host includes a first SCSI port 902 and a second SCSI port 904 communicatively coupled to an input/output interface 906. The interface provides communicative coupling to a first target 908 and a second target 910, each accessible over a respective independent fabric 912 & 914.

In this example, the host is configured without DMP filter functionality. Therefore, two independent LID tables 916 & 918 are provided, each table 916 & 918 containing LIDs 920 & 922 associated with targets 908 & 910 visible through the respective ports 924 & 926. In this way, the host is presented with access to targets without being presented with multiple routes to the target, thereby preventing any resultant compatibility problems.

Instances may be encountered in which a single target is visible to both ports of the input/output interface. If both routes were present to a host without DMP filter functionality, the Host would indicate that two targets were available. However, by utilizing the present invention, the host may be presented with a correct indication of the number of targets.

Figure 10:
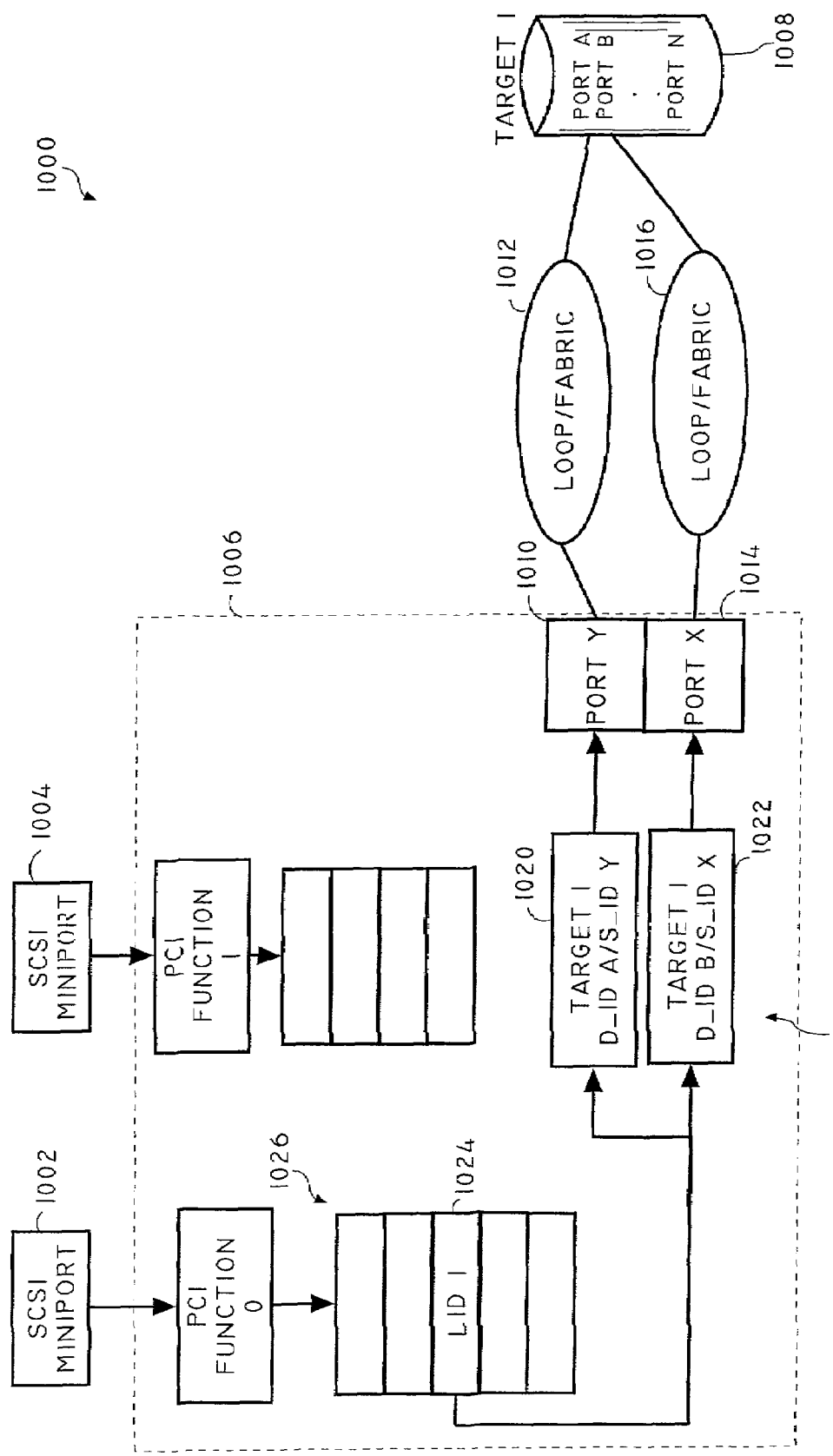
FIG. 10 is an illustration of an embodiment of the present invention wherein an input/output interface of the present invention provides routing to a single host over multiple ports and fabrics.

For example, referring now to FIG. 10, an embodiment 1000 of the present invention is shown wherein an input/output interface of the present invention provides routing to a single host over multiple ports and fabrics. A host includes a first port 1002 and a second port 1004 communicatively coupled to an input/output interface 1006. The input/output interface 1006 couples the host to a target 1008, such as a data storage device and the like.

The input/output interface 1006 provides multiple routes to the target 1008 over a first port 1010 communicatively coupled to a first fabric 1012 which may access the target 1008, as well as a second port 1014 communicatively coupled to a second fabric 1016 which may also be used to access the target 1008. Since the host does not have DMP filter functionality, the host may view the multiple routes as multiple target devices, and thus, may encounter errors in data transfer, storage and the like.

However, in this instance, both routes 1020 & 1022 as included in a target routing table 1018 are mapped to a single LID 1024 in a logical identifier table 1026. For example, the LID 1024 may map to a target's world wide node name. Thus, only one LID is presented to the host, thereby imparting an accurate indication to the host. Further, as described previously, the input/output interface 1006 may determine routing between the input/output interface 1006 and the target 1008, such as by determining an optimal route, alternating routes, and the like.

Figure 11:
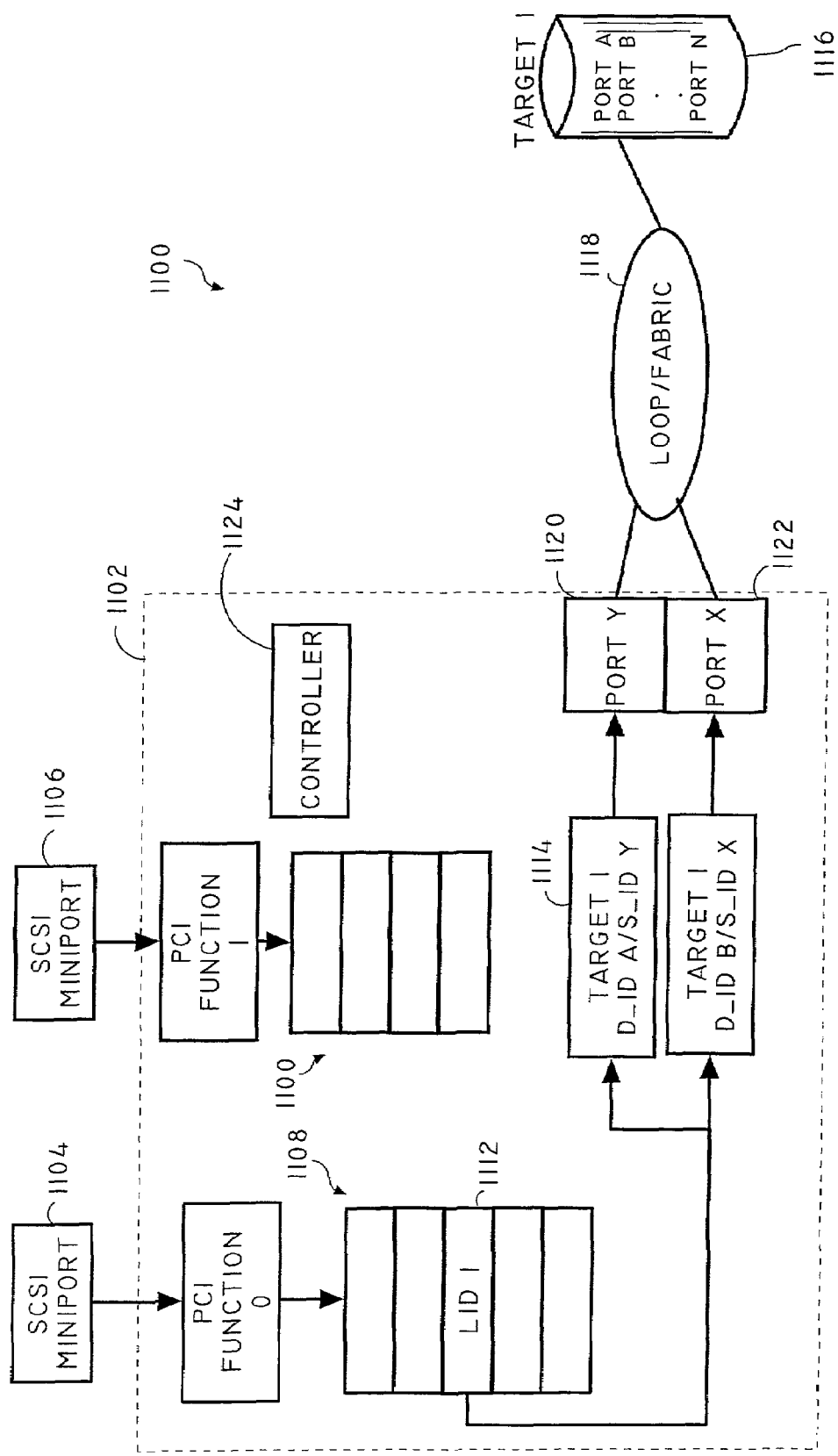
FIG. 11 is depiction of an embodiment of the present invention wherein multiple logical identifier (LID) tables are shown, in which a single LID is utilized to provide data transfer between an input/output interface having multiple ports connected to a single fabric for accessing a target.
Figure 12:
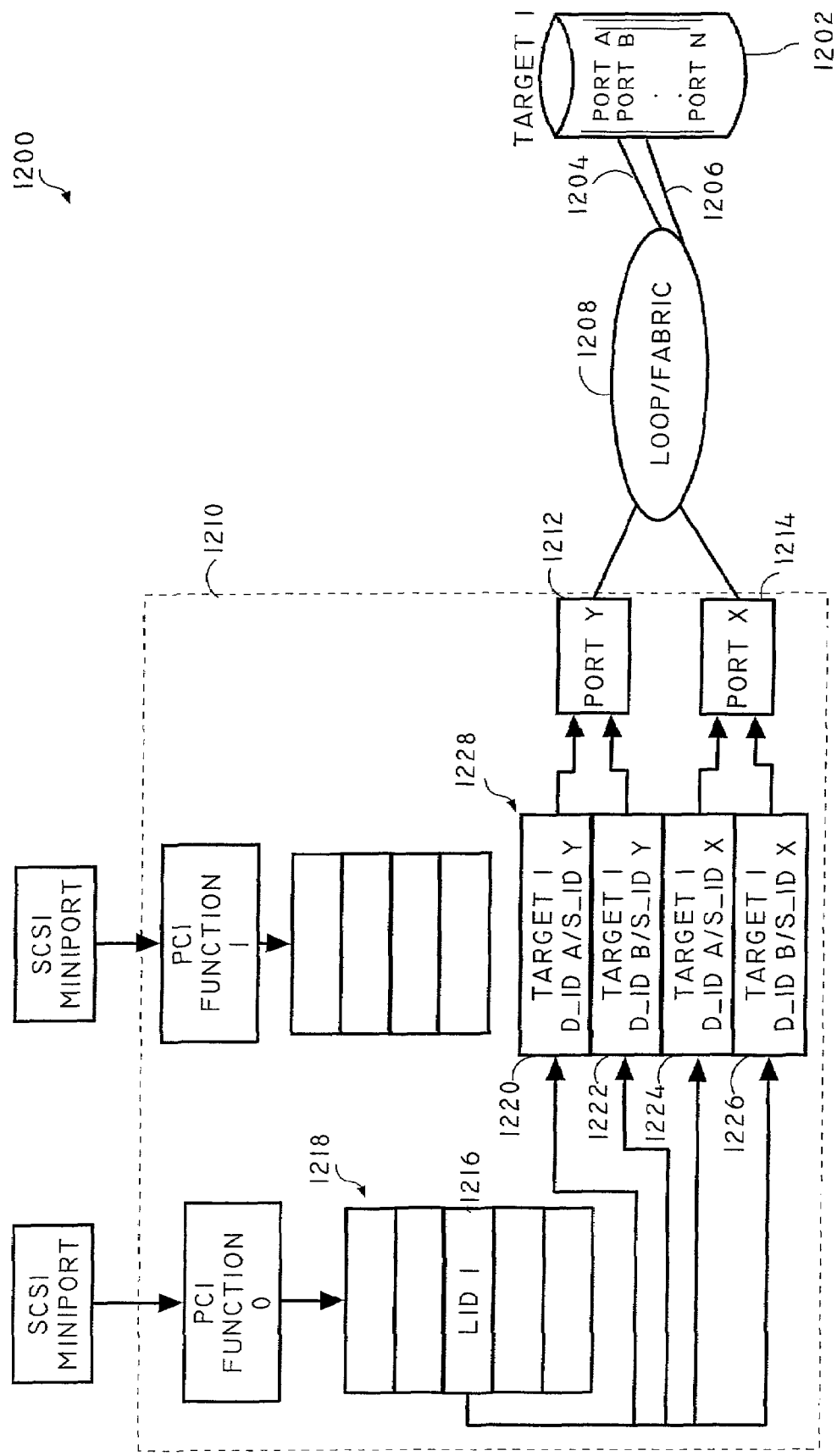
FIG. 12 is an illustration of an embodiment of the present invention wherein an input/output interface provides connectivity to a target having multiple access points over a fabric.

Likewise, mapping a target to an LID in more than one table may present a host not having DMP filter functionality multiple targets. Referring now to FIG. 11, an embodiment 1100 of the present invention is shown wherein multiple LID tables are shown, in which a single LID is used to provide data transfer between an input/output interface having multiple ports connected to a single fabric for accessing a target.

An input/output interface 1102 is connected to multiple ports 1104 & 1106 of a host. Each of the ports 1104 & 1106 has a corresponding LID table 1108 & 1110. In this instance, a single LID entry 1112 is utilized to access a target routing table 1114 to enable the host to access a target 1116. The target 1116 is communicatively linked to a fabric 1118, which is accessible by two ports 1120 & 1122 of the input/output interface 1102.

By providing a single LID in either LID table 1108 & 1110, a host without DMP filter functionality will be able to correctly ascertain the number of targets. Therefore, a controller 1124 of the input/output interface 1102 will preferably prevent duplicate entries from occurring in LID tables 1108 & 1110 when a host system lacks DMP filter functionality.

Similarly, if a target includes multiple ports suitable for providing access to the target over a connection, LIDs may be provided in a manner to prevent duplication of targets by a host lacking DMP filter functionality. For example, as shown in the exemplary embodiment 1200 depicted in FIG. 12, an input/output interface provides connectivity to a target having multiple access points over a fabric.

A target 1202 has multiple access points 1204 & 1206 to a fabric 1208. Additionally, an input/output interface 1210 may have multiple ports 1212 & 1214 to access the fabric 1208. Therefore, an LID 1216 of an LID table 1218 may be utilized to provide a connection from the host to the target over four possible routes, as indicated by four route entries 1220, 1222, 1224 & 1226 of a target routing table 1228. In this way, a single entry may be utilized by a host through an input/output interface 1210 of the present invention to obtain a connection with a target 1202 without encountering errors due to misinterpretation of multiple routes, and still be able to utilized the multiple routes through route selection by the input/output interface.

Figure 13:
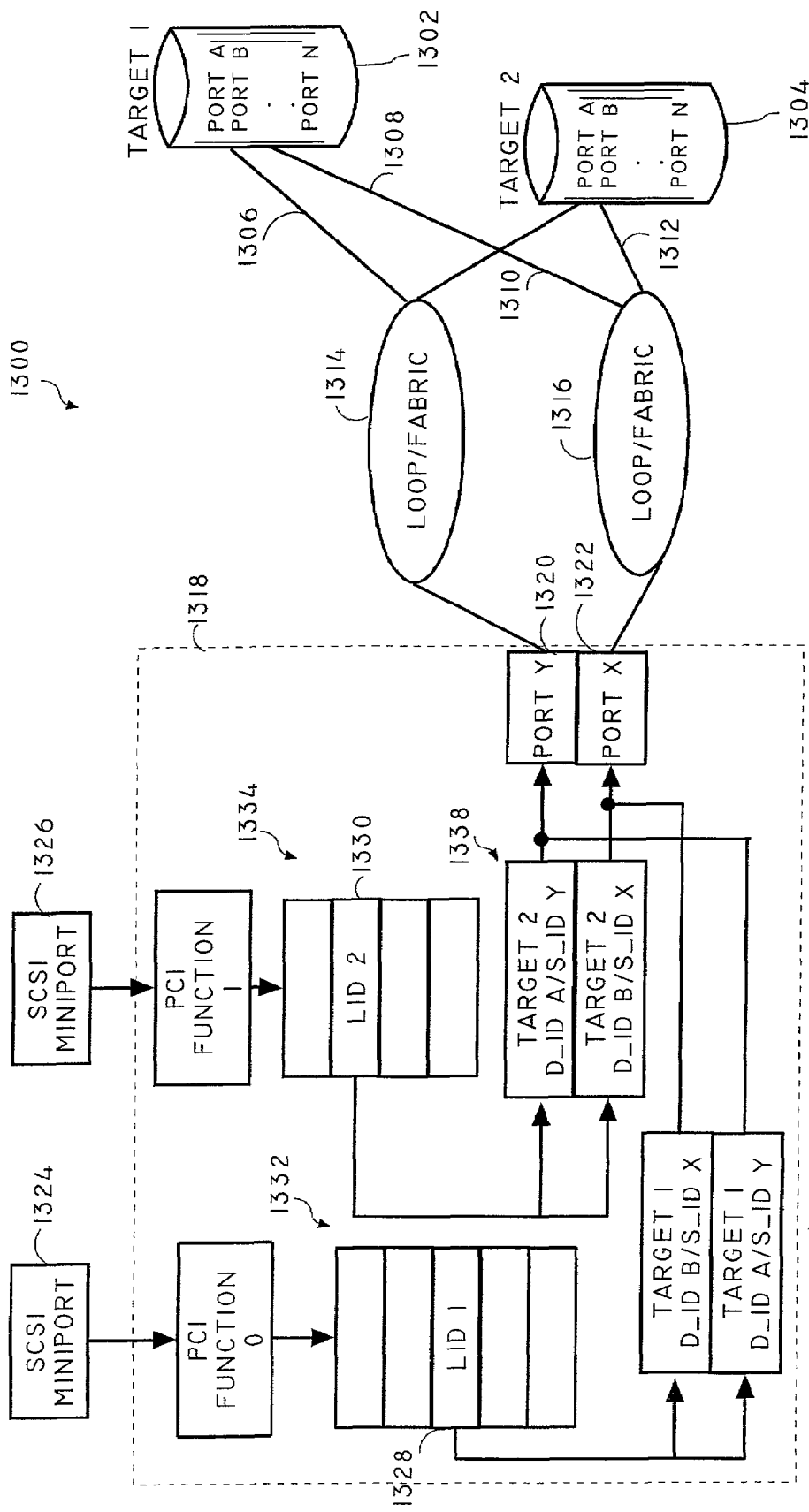
FIG. 13 is an embodiment of the present invention wherein multiple ports of an input/output interface are utilized to access multiple targets.

Referring now to FIG. 13, an embodiment 1300 of the present invention is shown wherein multiple ports of an input/output interface are utilized to access multiple targets. A first target 1302 and a second target 1304 each have multiple connections 1306, 1308, 1310 & 1312 to multiple fabrics 1314 & 1316. An input/output interface 1318 has a first port 1320 and a second port 1322 communicatively coupled to the fabrics 1314 & 1316. Additionally, a host has a first port 1324 & 1326 coupled to the input/output interface 1318 to access the targets 1302 & 1304.

Thus, a variety of routes are provided between the host and the targets 1302 & 1304, involving multiple host ports 1324 & 1326, multiple input/output interface ports 1320 & 1322 connected to fabrics 1314 & 1316 to access multiple ports 1306, 1308, 1310 & 1312 of each respective target 1302 & 1304. If presented to a host which does not have DMP filter functionality, confusion may result, as the host may believe that each route is a different target device, and therefore would not be able to fully utilize the functionality provided by the multiple routes.

However, the present invention may provide full functionality of the multiple routes to a host, even if the host does not have DMP filter functionality. The input/output interface 1318 provides an LID entry 1328 & 1330, in this instance separate LID tables 1332 & 1334 to represent respective targets 1302 & 1304. The LID entries are utilized in conjunction with target routing tables 1336 & 1338 to provide a route from the input/output interface 1318 to the targets 1302 & 1304.

For instance, a controller may select a route from the target routing table 1336 & 1338, the controller suitable for accessing the input/output interface and/or included as an integral part of the input/output interface. In this way, even though multiple routes are provided to multiple targets, the input/output interface may provide a depiction of the targets to a host that does not have DMP filter functionality, and still utilize the increased functionality achieved through use of the multiple routes.

Figure 14:
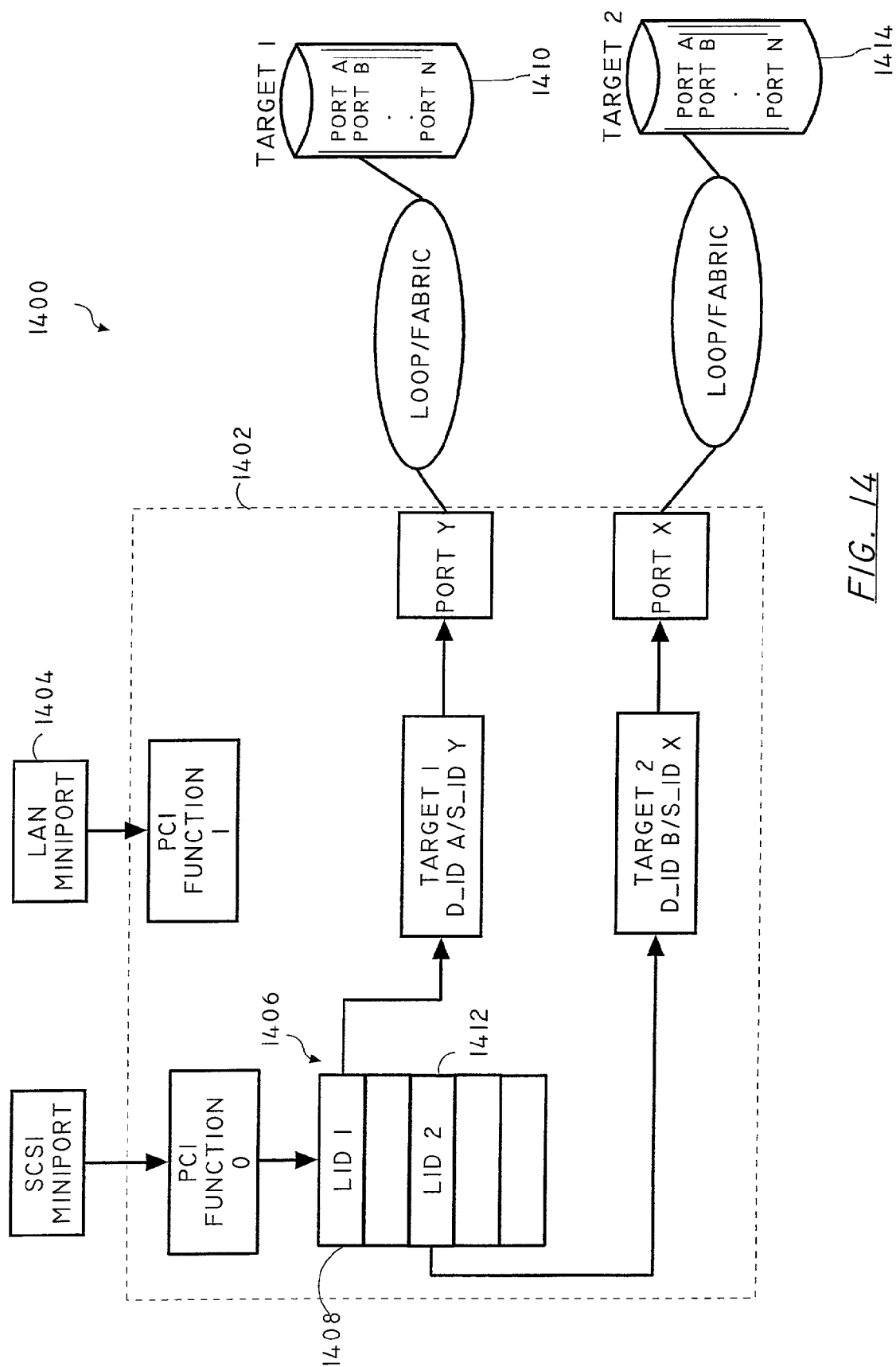
FIG. 14 is an illustration of an embodiment of the present invention wherein a port connecting a host to an input/output interface is changed.
Figure 15:
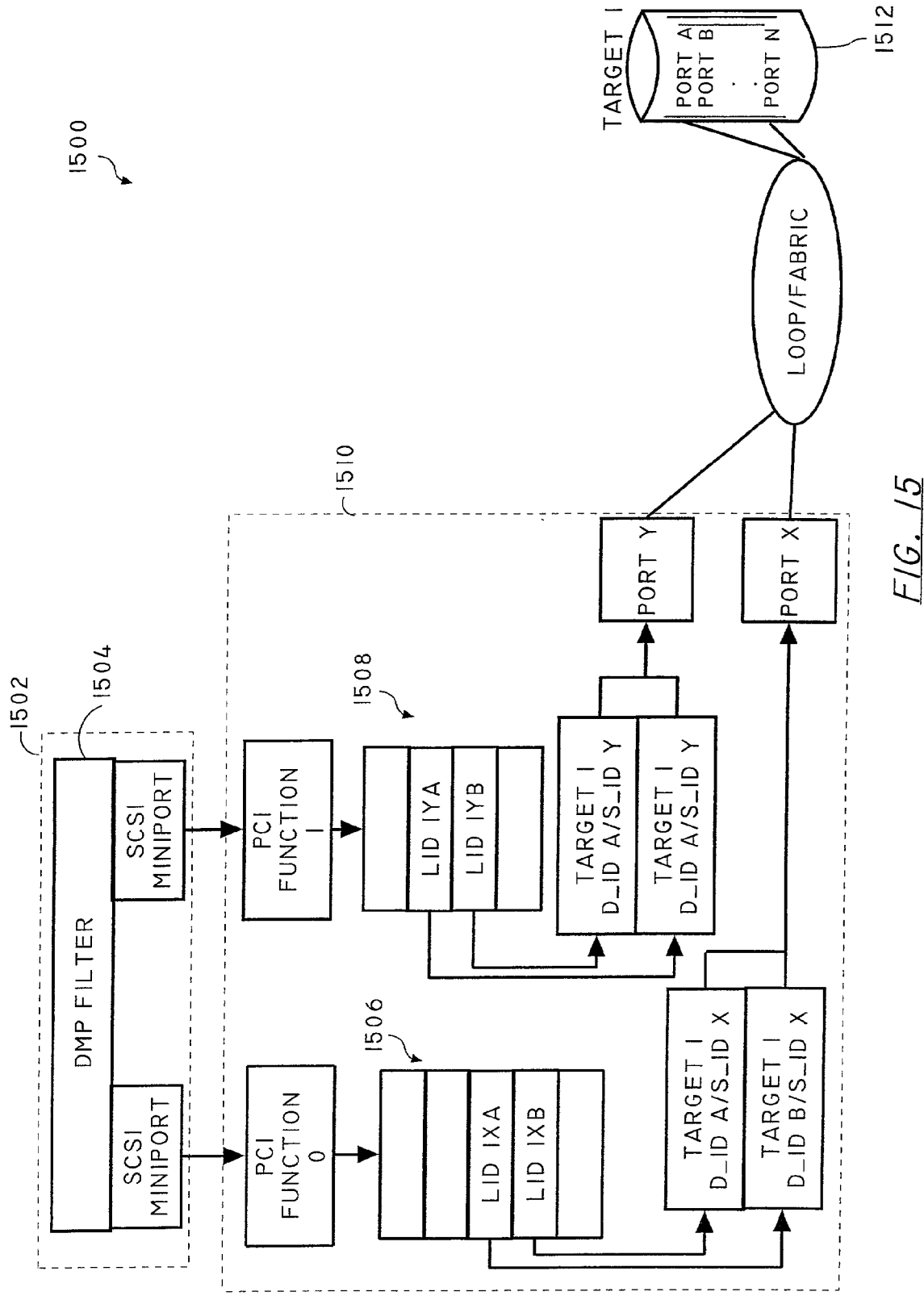
FIG. 15 is an illustration of an embodiment of the present invention wherein a host with DMP filter functionality is provided with an indication of each of the routes between the input/output interface and a target by the input/output interface, the input/output device operable as two independent interface devices.

Referring now to FIG. 14, an embodiment 1400 of the present invention is shown wherein a port connecting a host to an input/output interface is changed. When utilizing an input/output interface of the present invention, there may be instances encountered in which ports of a host accessing the input/output interface may be changed. For instance, referring again to FIG. 13, two SCSI miniports are connected to an input/output interface, and each port has a respective LID table. If a host connected to the input/output interface changed one of the SCSI miniport with a LAN miniport, it would result in the first target 1302 being invisible to the SCSI miniport.

Therefore, by utilizing the present invention, a controller of the input/output interface 1402 may recognize the change in the port 1404 from the host, and build a single LID table 1406. This LID table 1406 contains a first LID entry 1408 indicating the first target 1410, and a second LID entry 1412 indicating the second target 1414. Thus, the input/output interface may monitor the connections, and provide an LID table with the desired characteristics.

In instances in which the input/output interface encounters a host with DMP filter functionality, and thus the ability to accurately determined the number of targets when confronted with multiple data routes, the input/output interface may supply all the existing routes to the host. For instance, referring now to FIG. 15, an embodiment 1500 of the present invention is shown wherein a host with DMP filter functionality is provided with an indication of each of the routes between the input/output interface and a target by the input/output interface, the input/output device operable as two independent interface devices.

A host 1502 includes a DMP filter 1504 so as to enable the host to evaluate multiple data paths. The host 1502 may access a first LID table 1506 and a second LID table 1508 including entries for each data path from the input/output interface 1510 to the target 1512. Thus, the host 1502 is presented with each data path, and may determine a routing scheme for obtaining access to data in the target, writing data to the target, and the like. For instance, as shown, the input/output interface has constructed two LID tables 1506 & 1508 that contain LIDs mapped to every available path between the host and the target 1512. Therefore, it is the host's responsibility to make the routing decisions.

Figure 16:
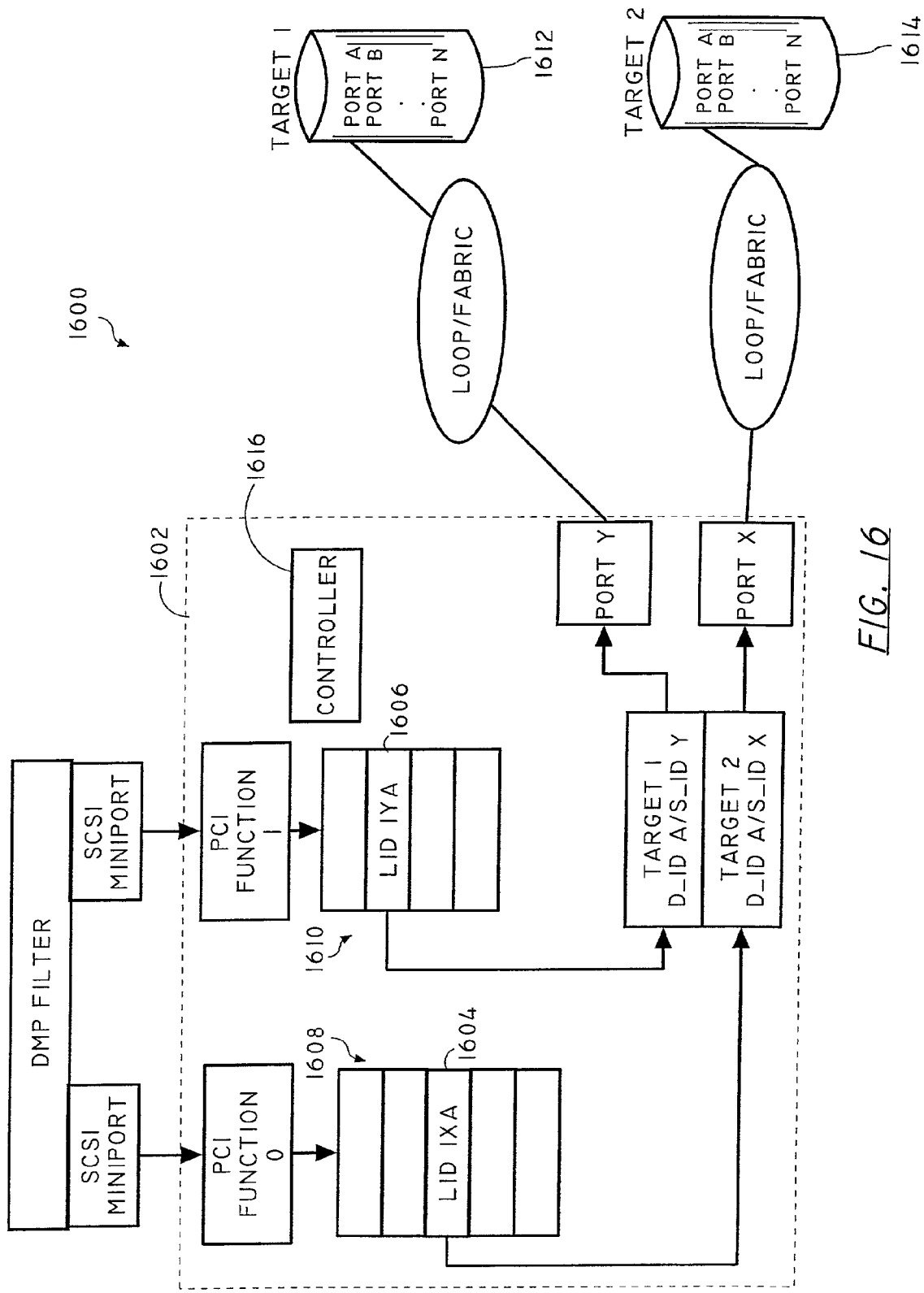
FIG. 16 is a depiction of an embodiment of the present invention wherein a host with DMP filter functionality includes two LID tables accessing a single target routing table to access multiple targets.

Similarly, referring now to FIG. 16, an embodiment 1600 of the present invention is shown wherein a host with DMP filter functionality includes two LID tables accessing a single target routing table to access multiple targets. An input/output interface 1602 includes LIDs 1604 and 1606 in respective LID tables 1608 and 1610 for providing access to a first target 1612 and a second target 1614. A controller 1616 of the input/output interface may provide these indications upon a determination that the host has DMP filter functionality.

Figure 17:
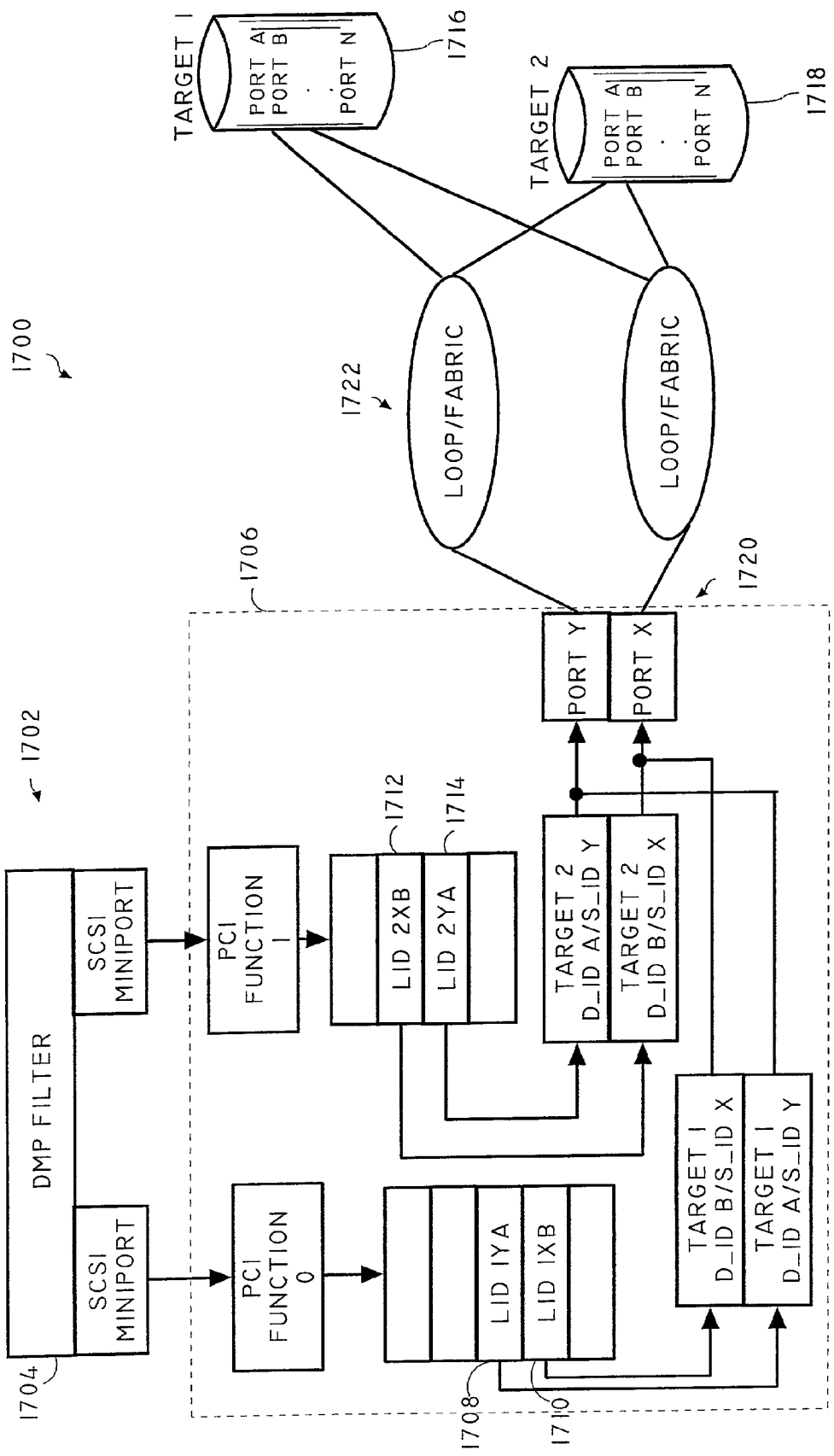
FIG. 17 is an illustration of an embodiment of the present invention wherein logical identifiers are utilized to access multiple targets over multiple fabrics using multiple ports of an input/output interface.

Additionally, referring now to FIG. 17, an embodiment 1700 of the present invention is shown wherein logical identifiers are utilized to access multiple targets over multiple fabrics using multiple ports of an input/output interface. A host 1702 includes a DMP filter 1704 in order to enable the host 1702 to resolve data paths into a correction indication of a number of targets. An input/output interface 1706 includes logical identifiers 1708, 1710, 1712 & 1714 provided to indicate each of the available routes between the input/output interface 1706 and the targets 1716 & 1718. The indicated routes may take into consideration ports 1720 and networks connections 1722 provided between the input/output interface 1706 and the targets 1716 & 1718. Therefore, the input/output interface 1706 may provide a host 1702 having DMP filter functionality 1704 an accurate view of the available routes.

Figure 18A:
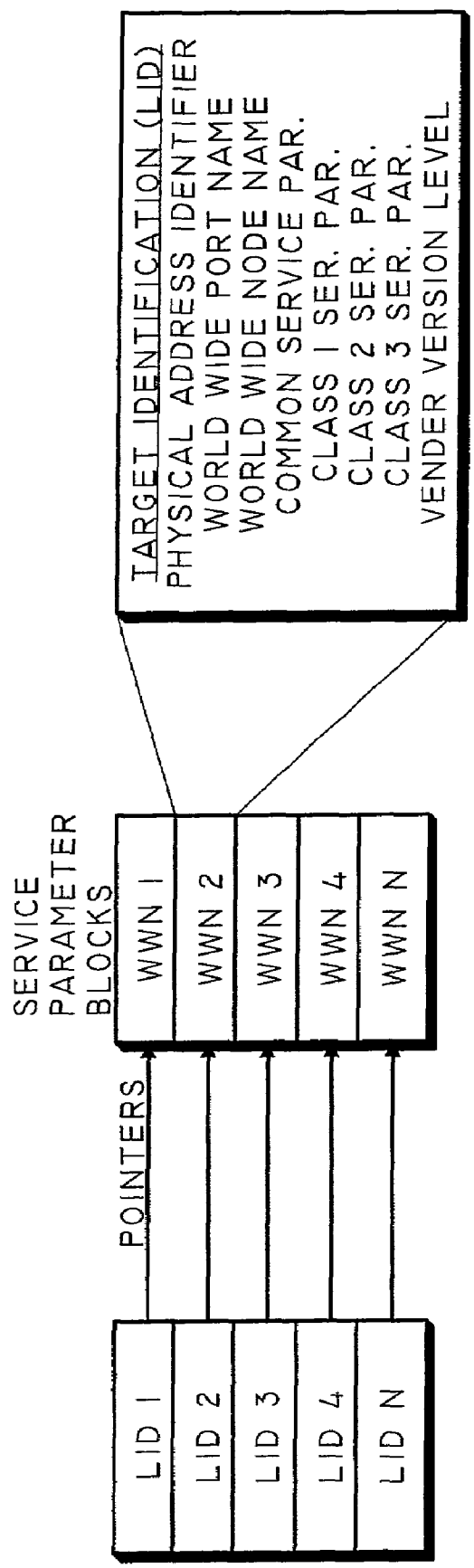
FIGS. 18A and 18B are illustrations of exemplary embodiments of the present invention wherein logic diagrams are utilized to illustrate exemplary methods of associating LIDs, WWNs and physical address identifiers.
Figure 18B:
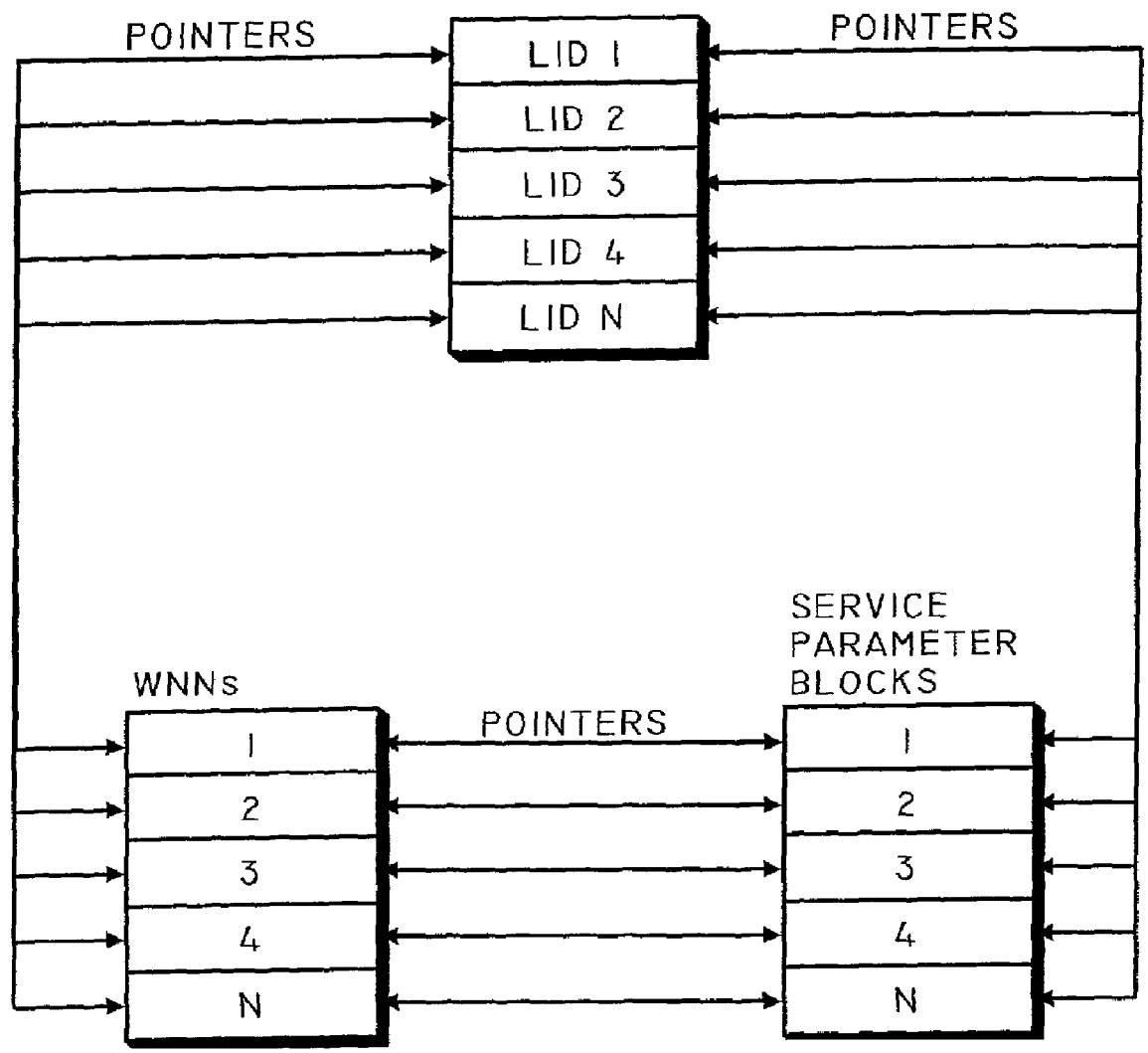

Referring to FIGS. 18A through 18C, additional embodiments of the present invention are shown wherein logic diagrams are utilized to illustrate exemplary methods of associating LIDs, WWNs and physical address identifiers. The memory space of an input/output interface, such as the interface shown in FIG. 2C, may be used for storing and associating the LIDs, WWNs, and physical address identifiers in accordance with the present invention.

FIG. 18A illustrates an example where an input/output interface 170 may add the LID for a particular target device 176a–176n to a service parameter block of the particular target device. For instance, the first circuit 178 may maintain a list of LIDs and a list of service parameter blocks. The LIDs may be associated to the respective WWN using address pointers to the respective service parameter block.

FIG. 18B illustrates an example where an input/output interface maintains separate lists for the LIDs, the WWNs, and the service parameter blocks that may contain the physical address identifiers. Address pointers may be used to form the associations between the LIDs, the WWNs, and the physical address identifiers. However, other methods of forming the associations may be implemented to meet the design criteria of a particular application.

Figure 19:
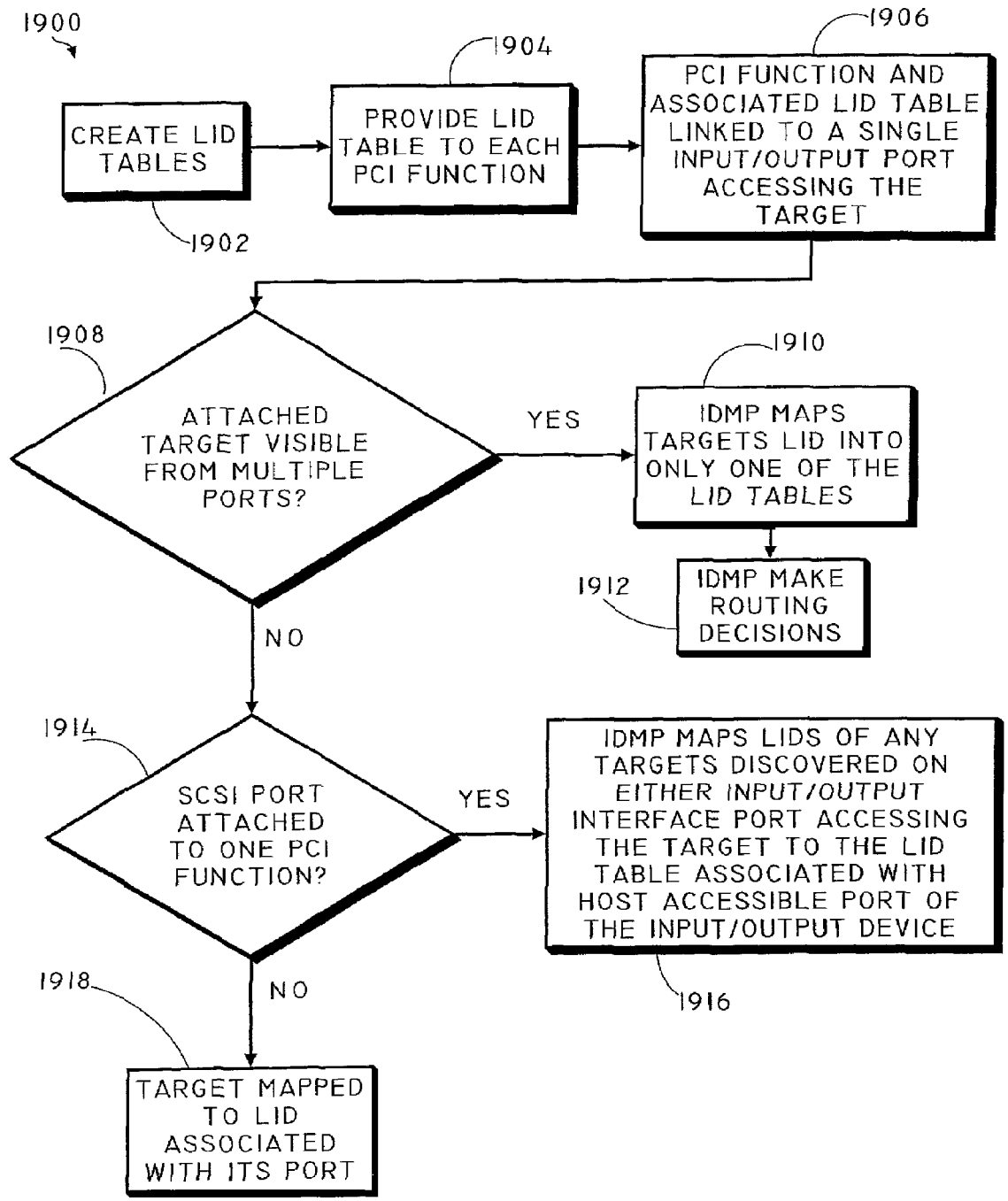
FIG. 19 is a flow diagram illustrating an exemplary method of the present invention wherein a simple multi-path resolution and routing scheme is provided.

Referring now to FIG. 19, an exemplary method 1900 of the present invention is shown wherein a simple multi-path resolution and routing scheme is provided. An input/output interface creates LID tables 1902, the LID tables provided to each PCI function 1904. In most instances, a PCI function and its associated LID table will be linked to a single input/output port accessing the target 1906, such as a single fibre channel port. Targets attached to a fibre channel port A may be mapped to LIDs residing in LID table A which is associated with PCI function A, and Targets attached to fibre channel port B will be mapped to LIDs residing in LID table B which is in turn associated with PCI function B.

Exceptions may include if an attached target is visible form multiple ports of an input/output interface, such as multiple fibre channel ports 1908. If so, the Integrated Dynamic Multipath (IDMP) implementation as employed by a controller of the input/output interface maps a target LID into only one of the LID tables 1910. In contemplated embodiments, the multiple paths for an I/O to travel across to access a target are controlled through the IDMP 1912 as configuring a controller of an input/output device. Another exemption may include if only a single data transfer host port, such as a SCSI miniport and the like, is attached to only one PCI function of the input/output interface 1914. For instance, if multiple connections between the input/output interface and the target are provided, IDMP may map LIDs of any targeted discovered on either input/output interface port accessing the target to the LID table associated with the host accessible port of the input/output device 1916. Otherwise, the target may be mapped to an LID associated with its port 1918.

If IDMP is disabled, a single LID table may be created and advertised to multiple PCI functions. An LID may be created for each route or path to a Target, and placed into the LID table.

Preferable, in this example, if a target has already been previously mapped to a LID that mapping and the LIDs placement onto one of the tables is fixed. Thus, the target should not get mapped to a new LID nor should a LID be moved from one table to another.

Thus, logical identifiers (LIDs) may be organized in LID tables in a variety of ways to provide access to targets, both in support of a host with DMP functionality, as well as for a host without such functionality by utilizing the present invention. In this way, an input/output interface is provided with may support a wide range of host functionality in an integrated device.

Selectable Input/Output Interface Configuration Option

By providing an input/output interface of the present invention, hosts with or without DMP functionality may still access a target device. The input/output interface provides integrated dynamic multipathing (IDMP) to hosts without DMP filters to provide a correct indication of the number of targets and still enable the host to fully utilize the increased functionality provided by having access to multiple routes to a target. Additionally, the input/output interface may provide an indication of each route available to a host with DMP filter functionality to enable the host to choose a desired route, vary route usage as desired by the host, and the like. Further, by providing an indication of the routes through the use of a logical identifier, an accurate depiction of the available routes may be easily attained by the host, without requiring the host to engage in a lengthy determination, which may consume host resources.

Therefore, there are a variety of options for logical mapping, such as utilizing a target's world wide node name, an initiator's world wide port name & a target's world wide port name, a target's port Id (P_ID), and the like as contemplated by a person of ordinary skill in the art. Each of the options may be preferable depending on the environment encountered. For example, systems that are not prepared to handle multiple paths to a target may get confused if multiple paths are presented to the host, such as a host without DMP filter functionality. This may lead to a multiplication of targets seen by the host. Conversely, in systems which have a dynamic multi-pathing (DMP) filter, i.e. are able to handle multiple paths to a target, may rely on these various paths being presented to the host system so it may handle load balancing, failovers, and the like. Additionally, another environment may be encountered in the storage side of a RAID system. For instance, a RAID typically manages its targets via physical IDs acquired via the JBOD slot in which the target resides. By utilizing the present invention, logical mapping may be provided in fibre channel storage vitualization that supports a choice between logical mapping options.

Figure 20:
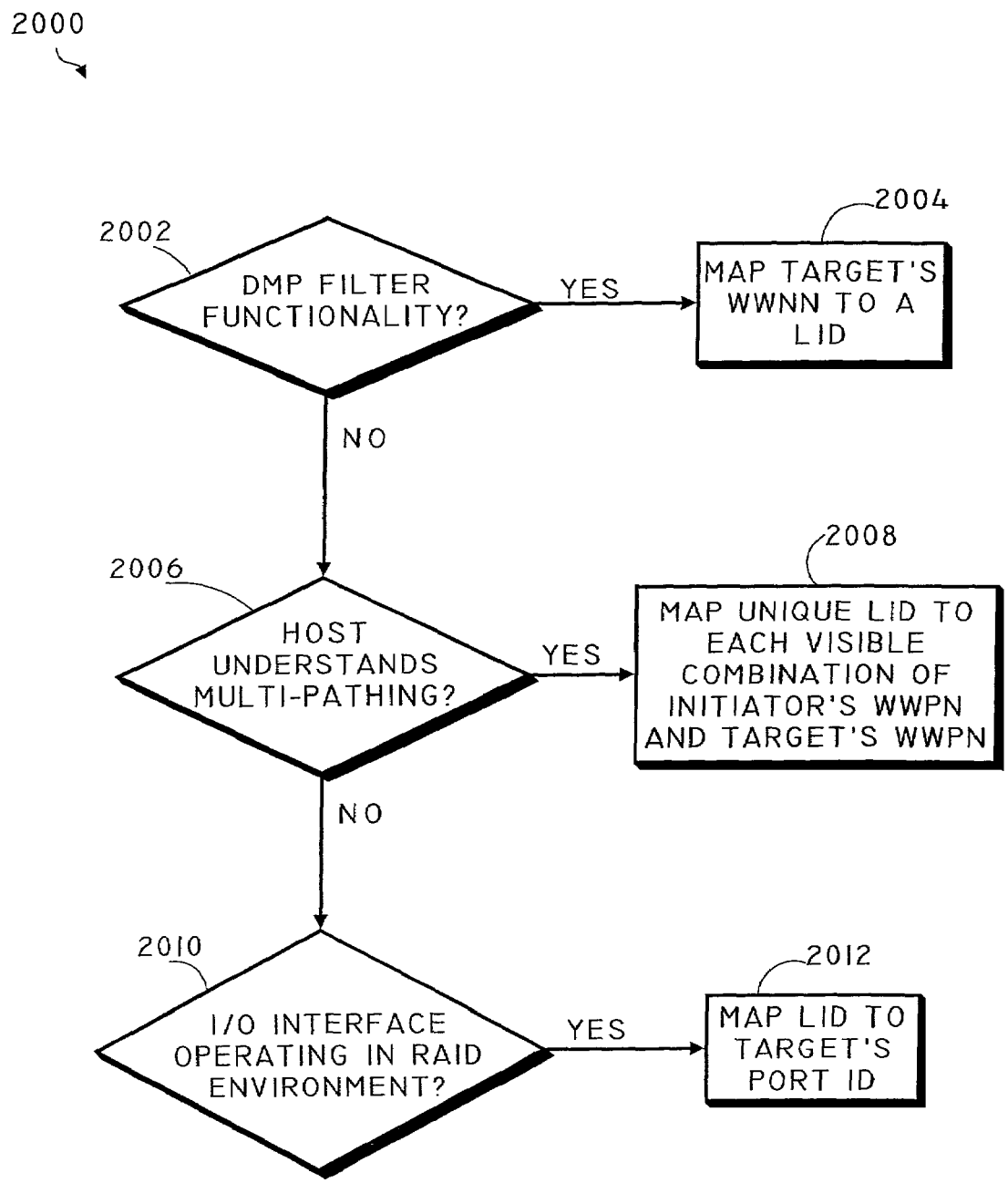
FIG. 20 is a flow diagram depicting an exemplary method of the present invention wherein selection of a configuration option is provided for enabling switching between a mode for supporting DMP filter functionality of a host by an input/output interface and a mode for supporting a host that does not include DMP filter functionality.

For example, referring now to FIG. 20, a method 2000 of the present invention is shown wherein selection of a configuration option is provided for enabling switching between a mode for supporting DMP filter functionality of a host by an input/output interface and a mode for supporting a host that does not include DMP filter functionality. An input/output device may be configured to support a variety of environments. If a host lacks DMP filter functionality 2002, the interface device may map a target's world wide node name to a LID 2004. For instance, if a host bus adapter resides in a simplistic environment, for example, a SCSI driver stack does not understand multi-pathing, then a target's world wide node name may be mapped to a bus/id. Therefore, regardless of how many paths may reside between an initiator and a target, how many ports reside on either device, and the like, a single bus/id is presented to the host by the input/output interface.

If the host understands multipathing 2006, the input/output interface may map a unique LID to each visible combination of an initiator's world wide port name and a target's world wide port name 2008. For instance, if the input/output interface resides in a more complex environment, such as a SCSI driver stack that understands multipathing and may use these paths to load balance I/O traffic, utilize different paths during a failover condition, and the like, the input output interface may map a unique LID, such as a Bus/ID combination, to each visible combination of the initiator's world wide port name and the target's world wide port name. Thus, the SCSI drive stack may explicitly dictate how I/O traffic is to flow between the initiator and the target.

If the input/output device resides in a more controlled environment, for example, the input/output interface is operating in a RAID environment 2010 such as functioning as the connection between a RAID controller and storage residing on a private loop, the LID, such as the bus/id the input/output interface presents to the RAID controller, to a target's port ID 2012. For instance, a RAID's disks are typically housed in JBODs, and are assigned hard AL_PAs via the JBOD slot the disk is residing in. By mapping the Bus/ID to a Port ID, which is the same as the AL_PA in this environment, drives may be swapped without burdening the host.

Figure 21:
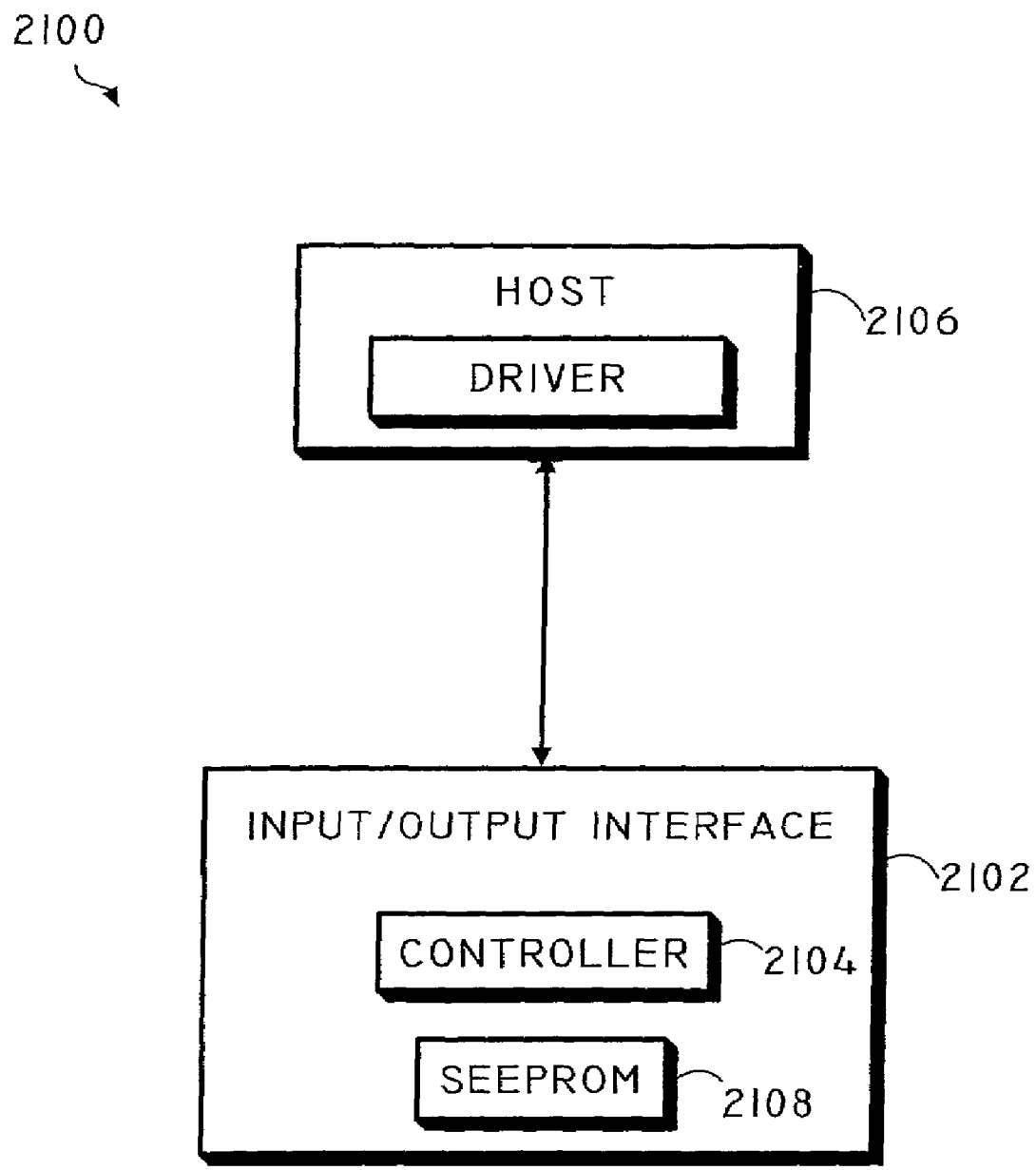
FIG. 21 is a block diagram illustrating an embodiment of the present invention wherein an input/output interface is configured for selecting between modes suitable for supporting the functionality of a host.

Referring now to FIG. 21, an embodiment 2100 of the present invention is shown wherein an input/output interface is configured for selecting between modes suitable for supporting the functionality of a host. An input/output interface 2102 includes an IDMP enabled option to enable switching between a variety of modes, such as the modes discussed in relation to FIG. 20. The IDMP option may be configured with a default configuration implemented by a controller 2104, to enable the BIOS to boot. Upon booting, the default option may be loaded, and switched over to an indicated option stored on the input/output interface 2102. This option, as desired by the host, may be stored in serial electronically erasable programmable read-only memory (SEEPROM) 2108 included on the input/output interface 2102 to store the desired default configuration, and enable the configuration to be changed by a user should a host 2106 with different operational parameters be employed. Thus, an input/output device may be configured for operation with a variety of host systems, and provide functionality as needed by the host system. Thus, a variable may be stored in SEEPROM which lets the input/output interface controller determine upon power up how to behave with respect to FIG. 20.

By providing an input/output interface of the present invention, LIDs and routing may be taken care of at the device level, and thus take responsibility from the host. Thus, a host does not need software to provide the routing, so that the present invention may be utilized by a variety of operating systems without requiring a change to the operating system.

Figure 22:
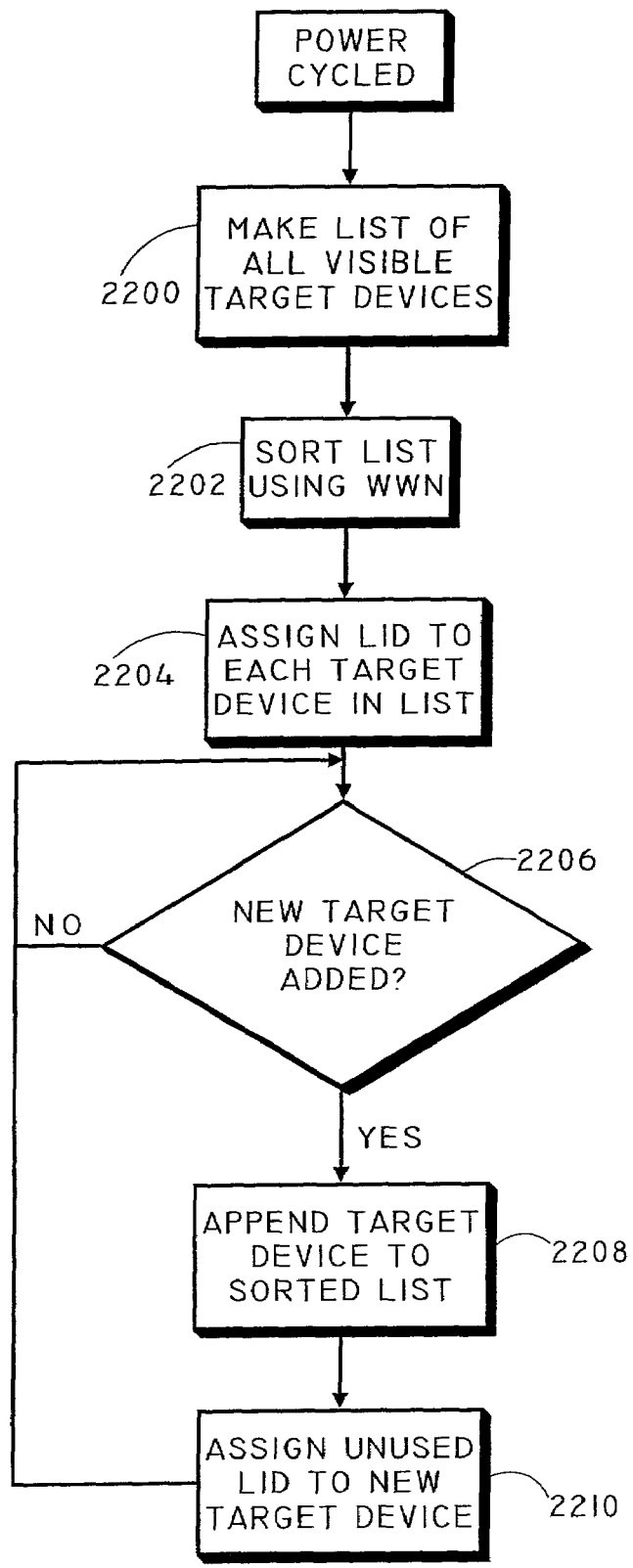
FIG. 22 is a flow diagram illustrating an exemplary method of the present invention wherein a start up operation of an input/output interface is shown.

Referring to FIG. 22, an exemplary method of the present invention is shown wherein a start up (e.g., loop initialization) operation of an input/output interface is shown. Upon power up or loop initialization, the input/output interface generally runs through a process to discover all target devices connected to a loop/fabric 2200.

The target devices are generally sorted by WWN 2202 and assigned LIDs relevant to the sorted order of the WWNs 2204, LIDs created according to the methods discussed in relation to FIGS. 1A & 1B, and the like. The LID to WWN mappings generally remain constant between power cycles of the input/output interface, regardless of the WWN to physical address identifier relationships. When a new target device is added to the loop 2206, the WWN of the new target device is generally not sorted into the list. The WWN of the new target device is generally appended to the end of the sorted list of WWNs 2208. An unused LID is generally associated with the WWN and the physical address identifier of the new target device 2210.

In the example mentioned above, when two independent loops are merged together, LID to WWN mappings in the input/output interface of the initial loop to be merged will generally remain unchanged. Preferably, unused LIDs are assigned to the targets on the loop being merged in, i.e. the second loop being added to the pre-existing LIDs of the initial loop, regardless of any physical address identifier changes that may take place.

In addition, LID to WWN mappings will generally remain constant across Initiator power cycles as long as no target devices are added to or removed from the loop. The WWNs of the target devices connected to the loop are generally sorted to handle the case where (i) no target devices were added to or removed from the loop and (ii) physical address identifiers have changed due to target devices having been physically moved or other initiators added to or removed from the loop. The LID to WWN mappings will generally remain unchanged. Since the WWN is generally used to associate the LIDs and the physical address identifiers of the target devices, the LID to target mapping will generally also remain unchanged regardless of a physical address change.

Figure 23:
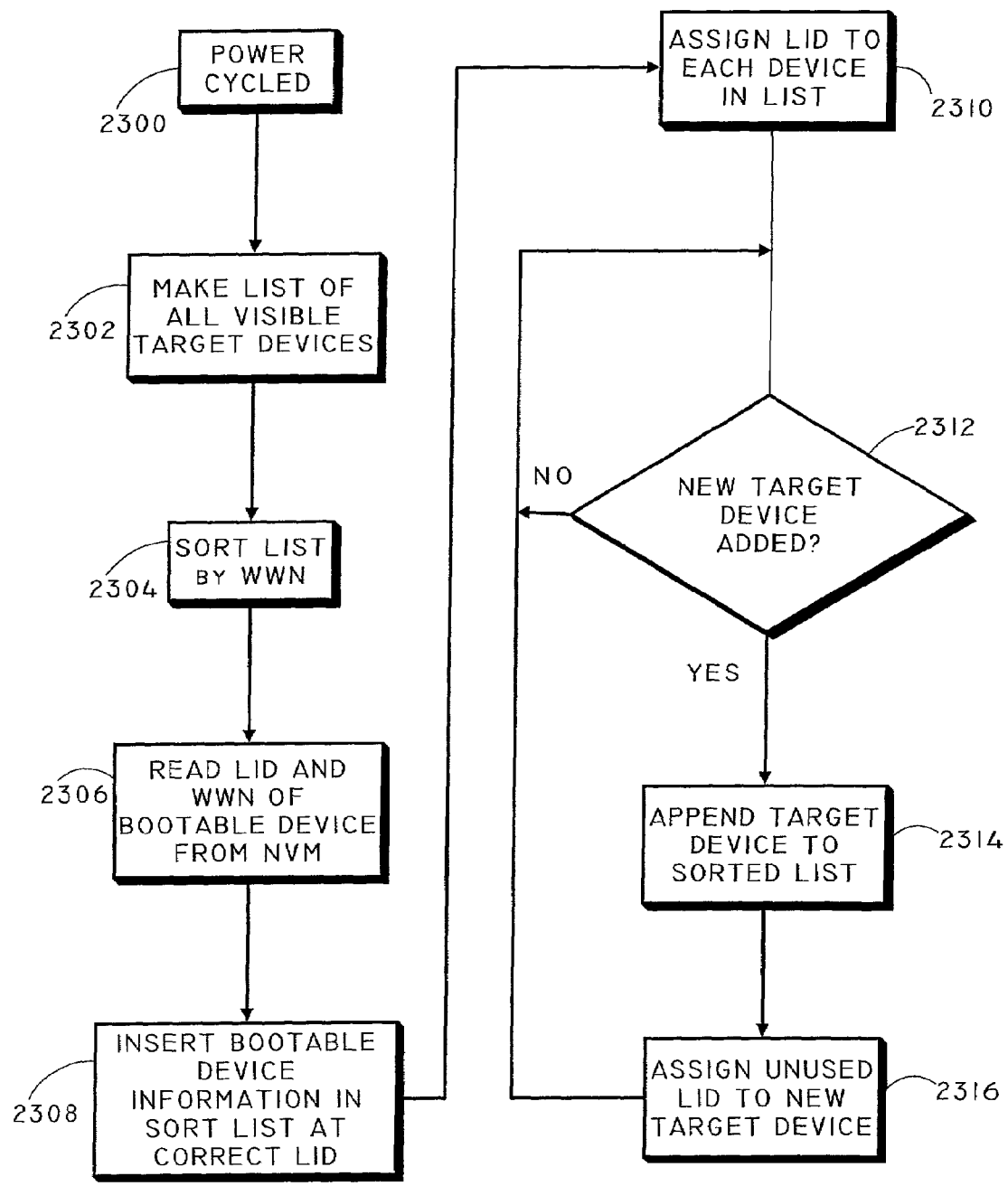
FIG. 23 is a flow diagram depicting an exemplary method of the present invention wherein a fixed LID is provided for one or more devices, including a boot device, is shown.

Referring to FIG. 23, a flow chart illustrating an alternative method that may provide a fixed LID for one or more devices, including a boot device, is shown. An alternative embodiment of the present invention may allow for one or more devices, that may include a boot device, to persistently regain the same LID. The input/output interface may comprise a small amount of non-volatile memory. The LID and WWN of one or more devices, including the boot device, may be stored in the non-volatile memory. The LID and WWN of a boot device will generally be stored in the non-volatile memory before any other device.

After the input/output interface has (i) powered up 2300 and (ii) discovered and sorted the WWNs of the target devices 2302 & 2304, the WWNs and the desired LIDs may be read from the non-volatile memory 2306. The WWNs from the non-volatile memory may be inserted into the sorted list at a position determined by the corresponding LID from the non-volatile memory 2308. The process of adding new target devices is generally similar to the process described in connection with FIG. 22 2312–2316. The host is generally able to boot using a particular target device on the loop, regardless of new target devices being added to or removed from the loop. The amount of non-volatile memory may be adjusted to balance the number of fixed LIDs and cost.

Failover

The present invention may also be utilized to provide failover functionality to host systems that do not support such routing capabilities. Failover is a backup operational mode that enables the functions of a system component, such as a processor, server, electronic data storage device, network path, database, and the like, to be provided by a secondary system component when the primary component becomes unavailable, such as through component failure, software failure, maintenance period, and the like. Thus, systems may be made fault tolerant, and may find particular utility over mission-critical systems that must be constantly available. In one example, tasks may be transferred to a standby system component in a manner that is invisible to the end user, such as a host and the like. Failover may be utilized in a variety of aspects of an input/output interface, host and target.

Previously, to provide data from target devices, targets were connected in very basic configurations, such as point-to-point and cross-coupled. However, component or software unavailability of even a single server may make data access impossible. One method utilized to address such problems includes the storage area network (SAN). A storage area network may provide a plurality of routes and components to enable target devices and hosts to utilize one path should another path become unavailable. For instance, a failed route may result from the failure of any of a variety of individual components of a route. Multiple routes, each with redundant components, may be used to ensure connection availability. The capacity for automatic failover means that normal functions may be maintained despite the inevitable interruptions caused by problems with equipment.

However, to provide failover to a system previously required that the host and/or target device provide the functionality. Additionally, specialized storage devices may be needed to provide such redundancy. However, by utilizing the present invention, a failover system may be provided that does not depend on host functionality, and thus may be provided to existing systems without a time intensive rewriting of software and hardware, and further may utilize preexisting targets, all in a manner that is invisible to a host system.

Figure 24:
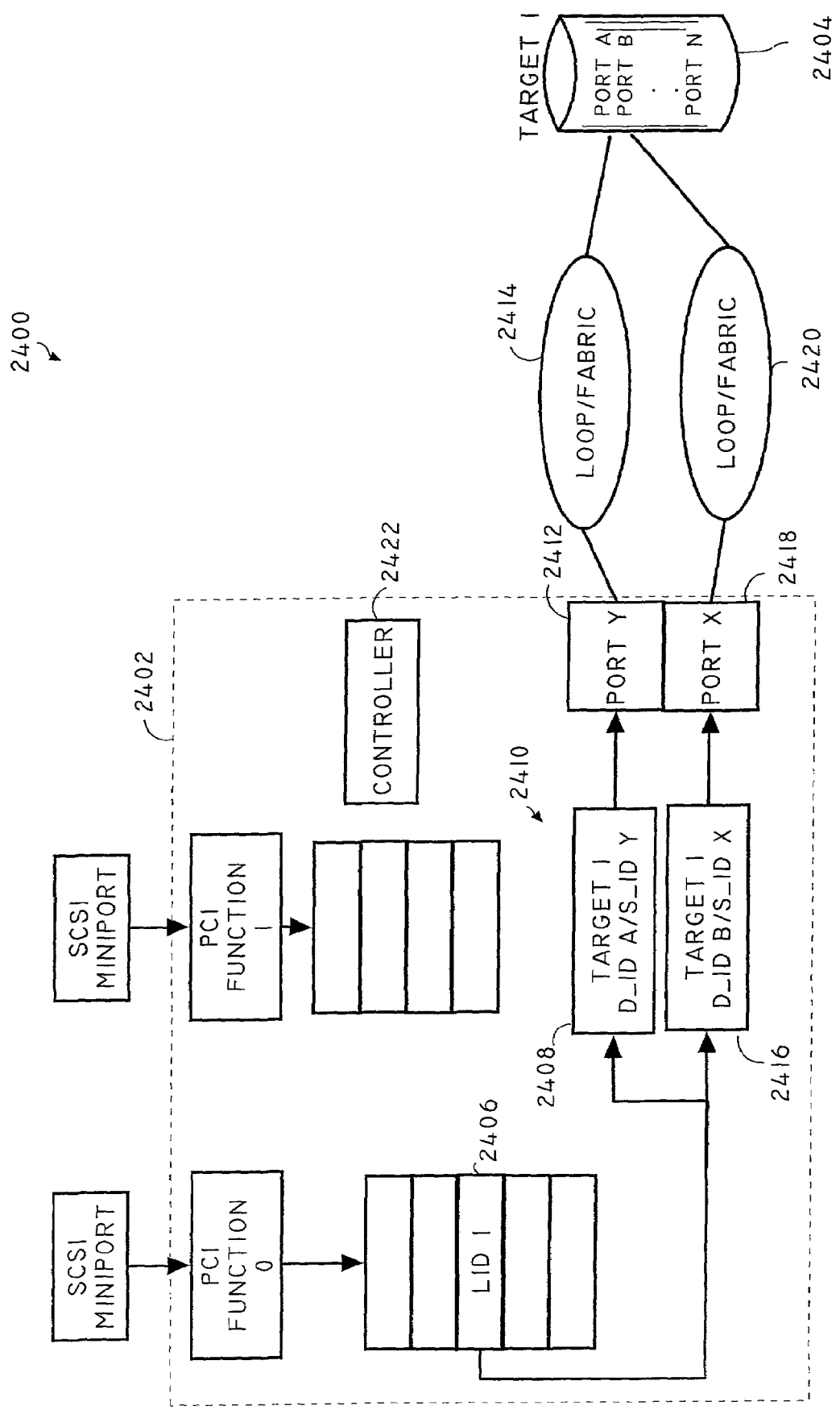
FIG. 24 is a diagram illustrating an embodiment of the present invention wherein a system including an input/output interface suitable for providing failover functionality is shown.
Figure 25:
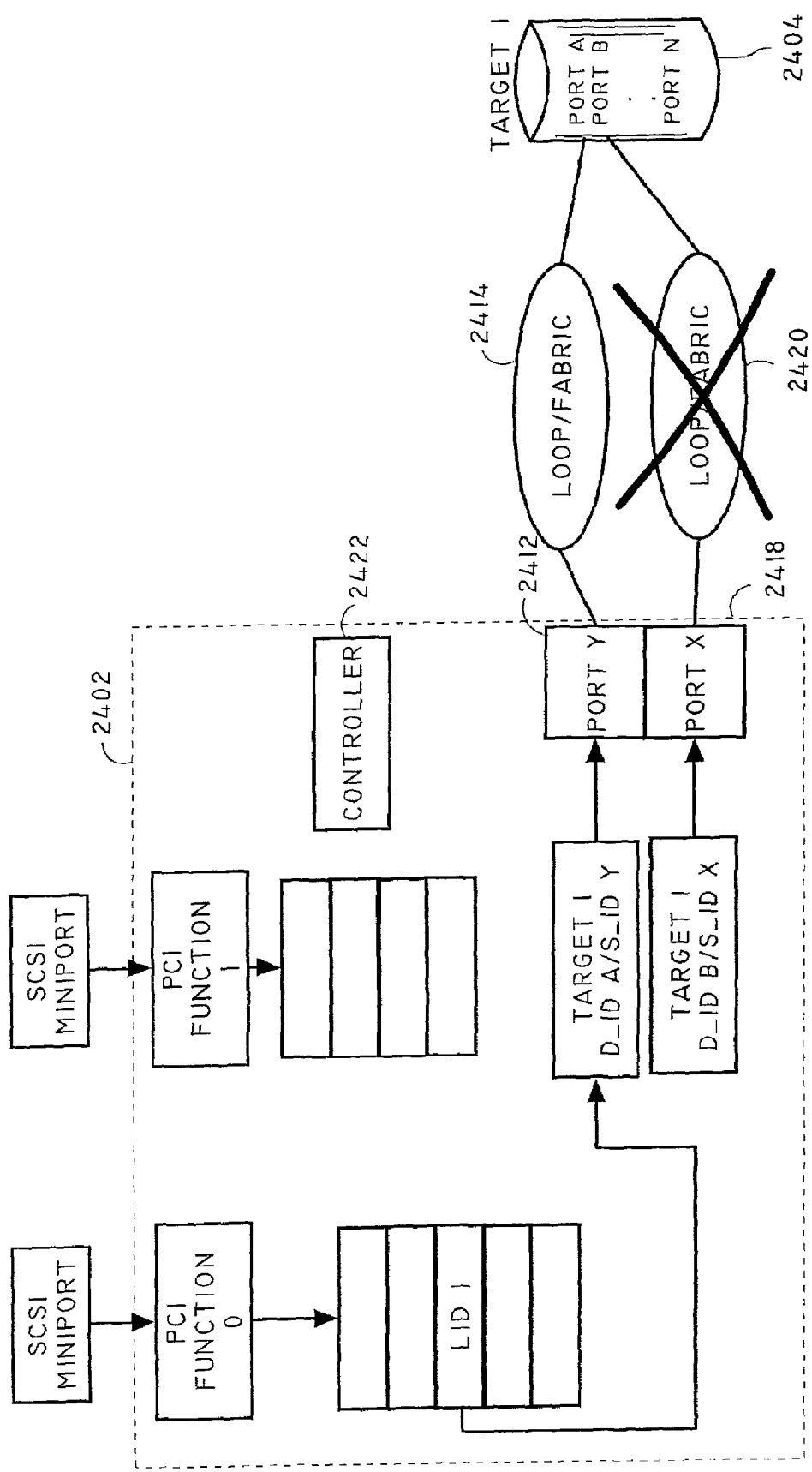
FIG. 25 is a diagram illustrating the exemplary embodiment shown in FIG. 24, wherein a component of the system has become unavailable.

Referring now to FIG. 24, an embodiment 2400 of the present invention is shown wherein a system including an input/output interface is suitable for providing failover functionality. Ordinarily, a redundant loop configuration may cause problems to a host that does not have DMP filter functionality, as previously described. For instance, if a dual ported input/output interface was utilized, whose ports were each connected separately to a common target, a host not having DMP filter functionality may see an independent image of the same target.

An input/output interface 2402 the present invention may map a plurality of routes from a target 2404 to the input/output interface 2402 in a single logical identifier (LID) 2406. The LID 2406 may be utilized to access a first routing entry 2408 in a target routing table 2410 to access data over a first port 2412 communicatively coupled to a first fabric 2414 which is connected to a first port of the target 2404. Additionally, the LID may be utilized to access a second routing entry 2416 in the target routing table 2410 to access data over a second port 2418 of the input/output interface 2402 communicatively coupled to a second fabric 2420, which is connected to the target 2404.

Thus, the input/output interface 2402 may utilize a first route and a second route to access the target 2404. A controller 2422 may select the routes so that the host does not need to support the DMP filter functionality, such as by utilizing load balancing, selecting a primary route and a second failover route, and the like as contemplated by a person of ordinary skill in the art. Therefore, the host is presented with a single indication of a single target, and therefore, is not confronted with possible target confusion, but yet may access a plurality of routes between the input/output interface 2402 and the target 2404.

A situation may be encountered in which a component of the system becomes unavailable. For instance referring now to FIG. 25, the embodiment as illustrated in FIG. 24 is shown in which a component of the system has become unavailable. In this instance, the loop connected to the second port 2418 has become unavailable. Such a failure may result in a loop loss of synchronization, link failure, and the like.

Figure 26:
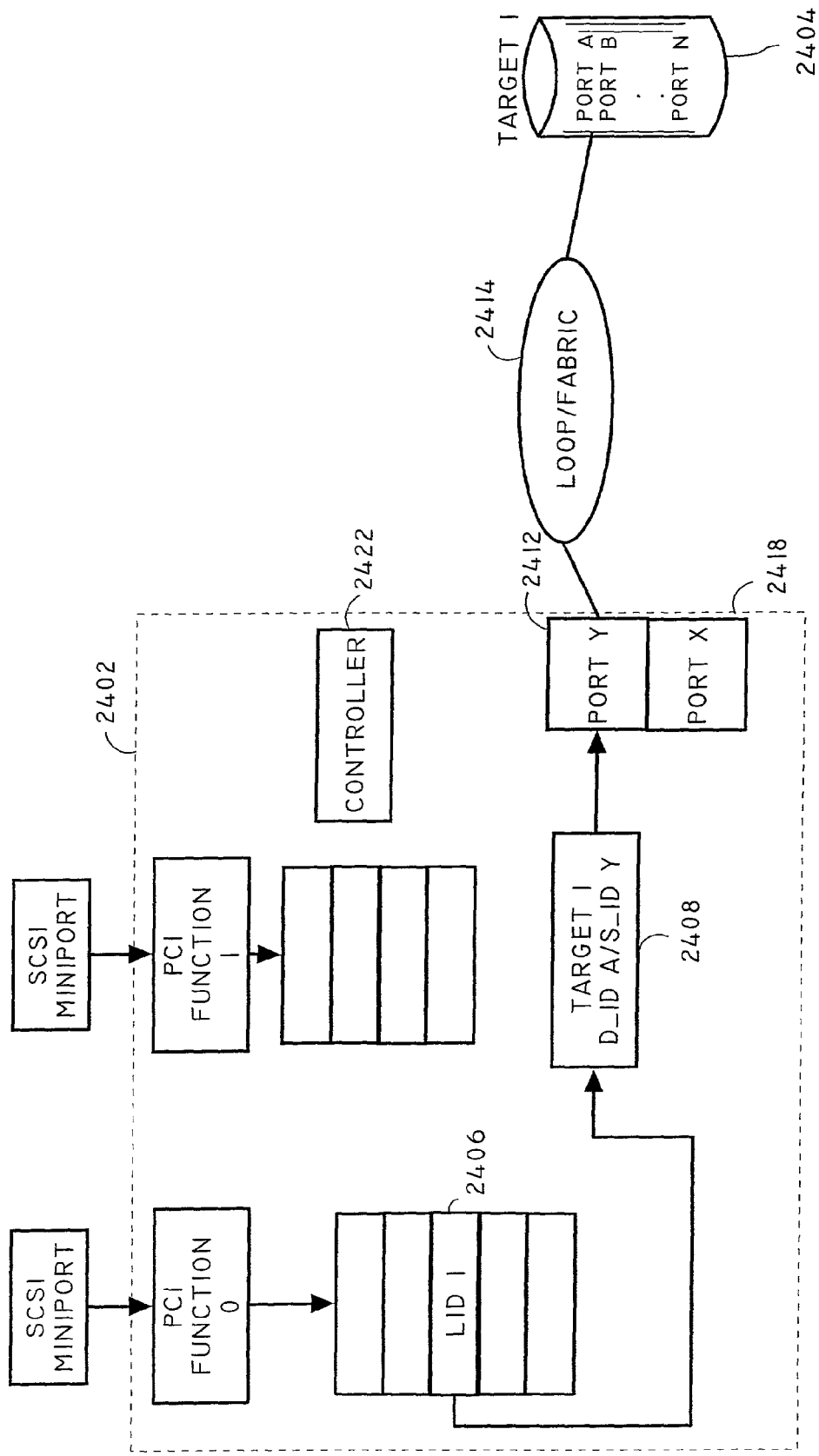
FIGS. 26, 27 and 28 are illustrations of an embodiment of the present invention wherein a route between an input/output interface and a target is physically changed.
Figure 27:
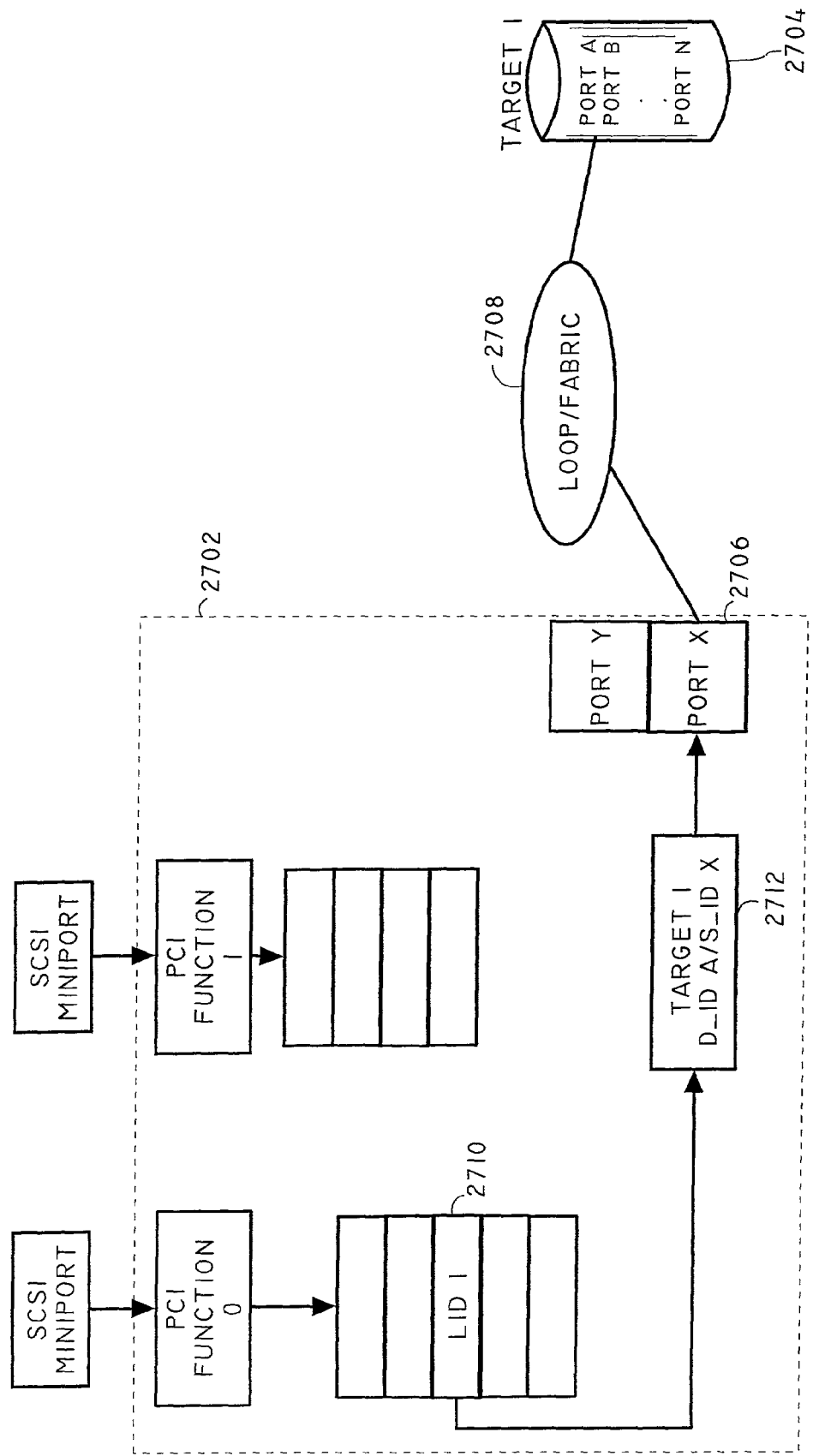

By leaving LID 2406 mapping fixed in the LID table, and having the controller 2422 select the first port 2412 and the first loop 2414 for connecting to the target 2404 through use of the target routing table entry 2408, a failover may be provided which is invisible to the host, as shown in FIG. 26. Therefore, in this embodiment, once a target is associated with a LID and that LID is bound to a LID table, the LID becomes static, i.e. the bindings are not remapped.

Therefore, even in an instance in which the route is changed, the LID will remain static in the LID table. For example, referring now to FIGS. 26 & 27, an embodiment of the present invention is shown wherein a route between an input/output interface and a target is physically changed. An input/output interface 2702 is communicatively connected to a target 2704 utilizing a first port 2706 which access a fabric 2708 to access the target 2704. As before, a logical identifier (LID) 2710 is presented to a host to provide an accurate target description. The LID 2710 is utilized as a pointer to a target routing table 2712 to obtain a route between the interface 2702 and the target 2704.

Figure 28:
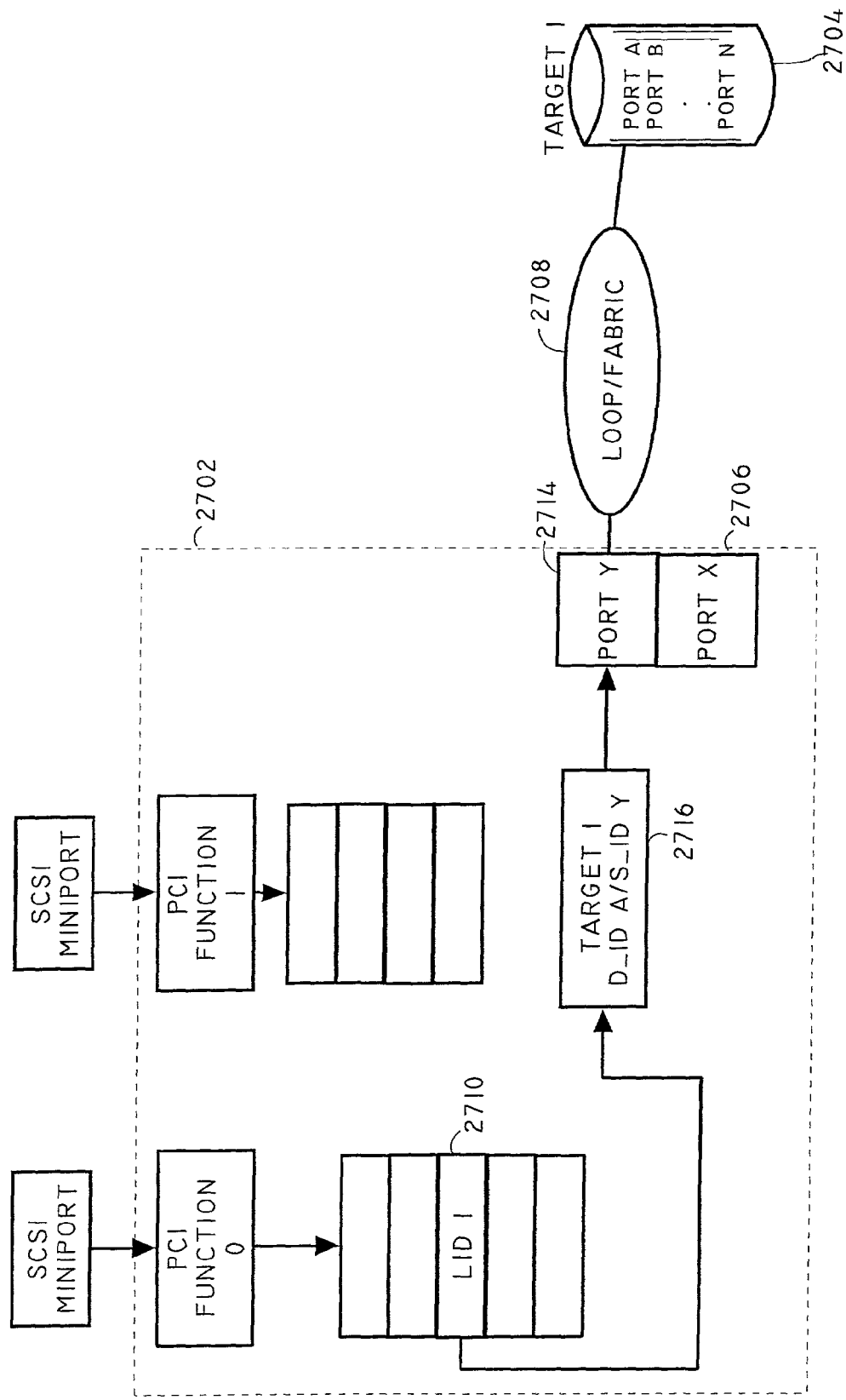

While under power, if the input/output interface's cable is switched from the first port 2706 to the second port 2714, as shown in FIG. 28, the target 2704 is still mapped 2716 to the LID 2710. The routing change, as accomplished through the target routing table, may be performed by a controller of the input/output interface 2702. Thus, the host would be unaware of a cable switch, and may continue to function in a normal manner.

Load Balancing

In accordance with the present invention, load balancing may be performed to increase the performance of the input/output interface. Communication overhead, delivery delay, and the like may occur when data traverses a route that has heavier traffic than the one with a longer distance and lesser traffic. Thus, data transfer may be greatly affected by the route taken, as well as the traffic encountered on each route.

By utilizing the present invention, the input/output interface may engage in load balancing to increase bandwidth and response time to host and target systems. Logic as implemented by a controller in an input/output interface may configure the interface to take into account a variety of load considerations. Therefore, an input/output interface of the present invention may dynamically balance loads to targets across multiple paths, with presenting duplicate targets to the host, may enable the utilization of all the data paths between an input/output interface in an efficient manner, does not require that a DMP filter capable of load balancing be configured for every host OS, and the like as contemplated by a person of ordinary skill in the art.

Figure 29:
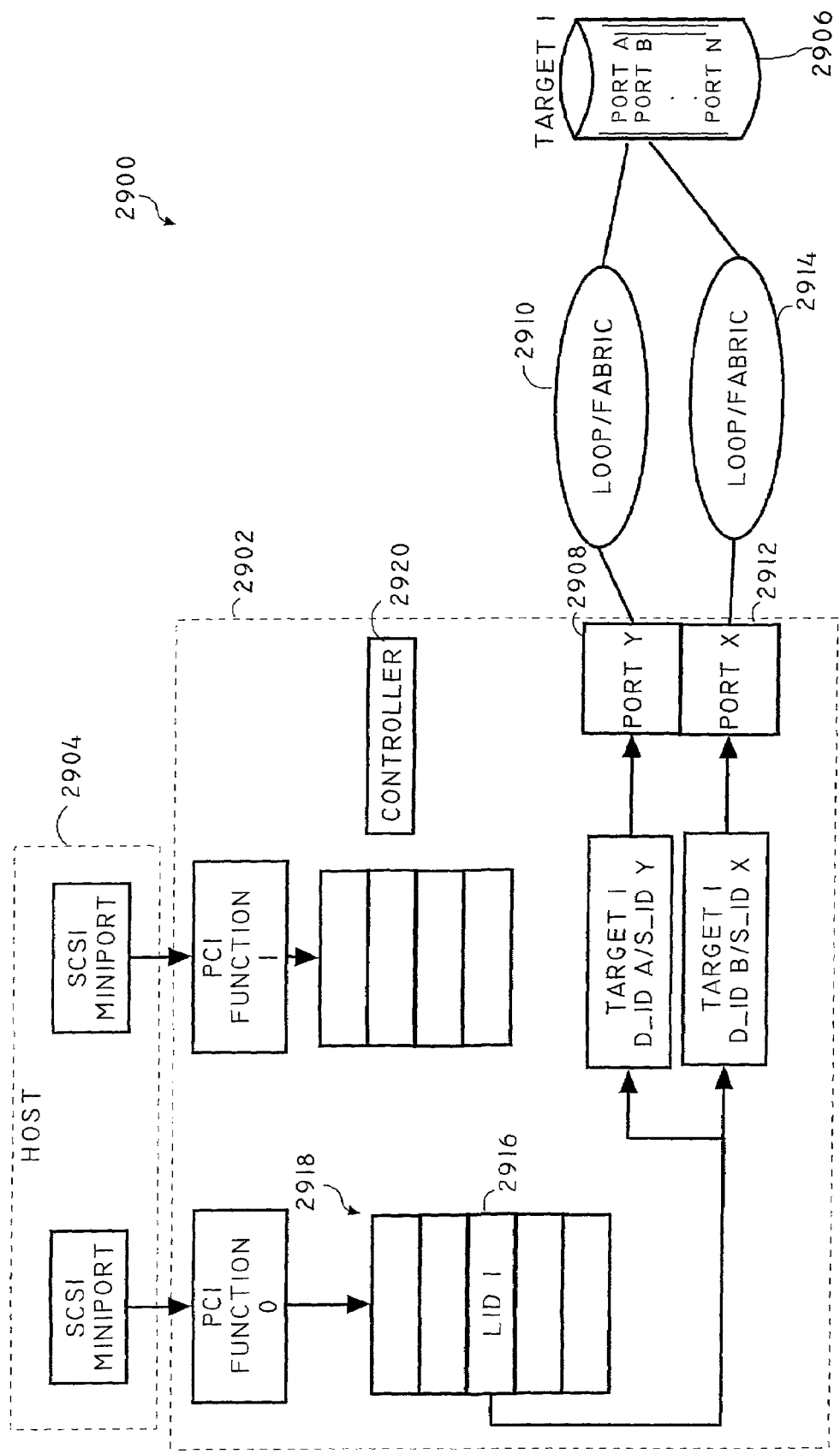
FIG. 29 is an embodiment of the present invention wherein load balancing is performed by an input/output interface.
Figure 30:
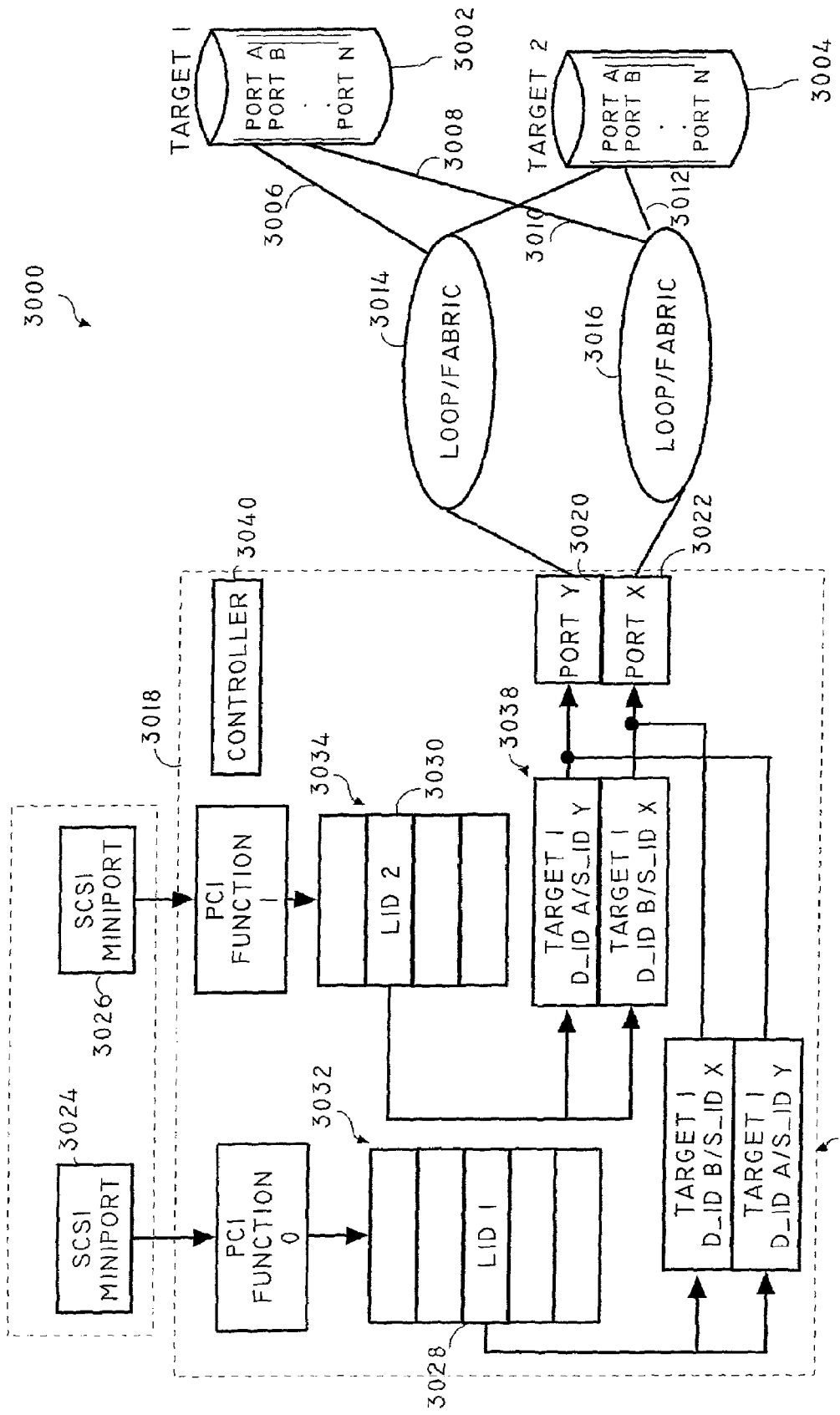
FIG. 30 is an illustration of an embodiment of the present invention wherein multiple targets having multiple routes with an input/output interface having load balancing functionality are shown.

For instance, referring now to FIG. 29, an embodiment 2900 of the present invention is shown wherein load balancing is performed by an input/output interface. An input/output interface 2902 is provided between a host 2904 and a target 2906. The input/output interface 2902 includes a first port 2908 communicatively coupled to a first loop 2910 to provide a first data route between the input/output interface 2902 and the target 2906. Likewise, a second port 2912 is connected to a second loop 2914 which is communicatively coupled to the target 2906 to provide a second data route between the input/output interface 2902 and the target 2906. Thus, two data routes are provided between the input/output interface 2902 and the target 2906 to enable greater data transfer performance, bandwidth, redundancy, and the like.

Additionally, the input/output interface 2902 may provide integrated dynamic multipathing filter functionality as previously described, to enable the input/output interface 2902 to provide multiple routes to a host 2904 which does not include such DMP functionality. Thus, an LID 2916 is provided in an LID table 2918 to present a single indication of a target 2906 to the host 2904. A controller 2920 is included to choose between the first data route and the second data route to enable a host, as utilizing an LID of the present invention, to access and receive data from a target 2906.

The controller 2920 implements a load balancing scheme utilizing the first data route, through the first port 2908, and the second data route, through the second port 2912, to increase the performance of data transfers between the input/output interface 2902 and the target 2906, and therefore between the host 2904 and the target 2906. In this way, load balancing may be provided to a host independent of the host's operation system and software, and thus, does not require extensive modification of the host to achieve the functionality. A variety of load balancing schemes and algorithms are contemplated by the present invention without departing from the spirit and scope therefore, such as through monitored traffic, alternating uses based on ports, connections, target availability, and the like.

Utilizing the present invention may also provide load balancing over multiple routes to multiple targets. For example, referring now to FIG. 30, an embodiment 3000 of the present invention is shown wherein multiple targets having multiple routes with an input/output interface having load balancing functionality are provided. A first target 3002 and a second target 3004 each have multiple connections 3006, 3008, 3010 & 3012 to multiple fabrics 3014 & 3016. An input/output interface 3018 has a first port 3020 and a second port 3122 communicatively coupled to the fabrics 3014 & 3016. Additionally, a host has ports 3024 & 3026 coupled to the input/output interface 3018 to access the targets 3002 & 3004.

Thus, a variety of routes are provided between the host and the targets 3002 & 3004, involving multiple host ports 3024 & 3026, multiple input/output interface ports 3020 & 3022 connected to fabrics 3014 & 3016 to access multiple ports 3006, 3008, 3010 & 3012 of each respective target 3002 & 3004. As before, if the multiple routes were presented to a host which does not have DMP filter functionality, the host may believe that each route is a different target device. Additionally, such a host device would not be able to fully utilize the functionality provided by the multiple routes.

However, the present invention may provide full functionality of the multiple routes to a host, even if the host does not have DMP filter functionality. The input/output interface 3018 provides an LID entry 3028 & 3030, in this instance is separate LID tables 3032 & 3034 to represent respective targets 3002 & 3004. The LID entries are utilized in conjunction with target routing tables 3036 & 3038 to provide a route from the input/output interface 3018 to the targets 3002 & 3004.

A controller 3040 may select a route from the target routing table 3036 & 3038. For instance, the controller 3040 may take into account the provision of multiple ports, as well as multiple fabrics and multiple ports which may be utilized on the target to access the target to load balance access to the targets. Thus, even though multiple routes are provided to multiple targets, the input/output interface may provide a depiction of the targets to a host that does not have DMP filter functionality, and still utilize the increased functionality achieved through use of the multiple routes.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the input/output interface of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus for providing an input/output interface with failover functionality between a host and a target, comprising:
   a first data transfer route suitable for communicatively coupling the apparatus to a host system;
   a second data transfer route suitable for communicatively coupling the apparatus to a target;
   a third data transfer route suitable for communicatively coupling the apparatus to the target;
   a memory suitable for storing electronic data, the memory including a program of instructions; and
   a controller communicatively coupled to the first data transfer route, the second data transfer route, the third data transfer route and the memory, the controller suitable for performing the program of instructions, wherein the program of instructions configures the controller to transfer data between the host and target utilizing the third data transfer route should the second data transfer route become unavailable, utilization of the third data transfer unaffecting operation of the host and wherein a logical identifier is utilized to access the apparatus by the host, the logical identifier being a 16-bit value configured from a bus field and an id field, the logical identifier remaining static when the third transfer route is utilized.

2. The apparatus as described in claim 1, wherein the host, when confronted with multiple routes to a target, views the multiple routes as multiple targets.

3. The apparatus as described in claim 1, wherein the logical identifier is included in a logical identifier table.

4. The apparatus as described in claim 1, wherein the logical identifier is associated with a target routing table, the target routing table including a target routing entry indicating a data transfer route between the target and the apparatus.

5. The apparatus as described in claim 4, wherein the route includes at least one of world wide node name and world wide port name.

6. The apparatus as described in claim 4, wherein the target routing entry includes a physical address of the target.

7. The apparatus as described in claim 1, wherein the apparatus is communicatively coupled to the target over at least one of a loop and fabric.

8. A system including an input/output interface with failover functionality for communicatively coupling a host and a target, comprising:
   a host including an input/output interface, the input/output interface including
      a first data transfer route suitable for communicatively coupling the input/output interface to the host;
      a second data transfer route suitable for communicatively coupling the input/output interface to a target;
      a third data transfer route suitable for communicatively coupling the input/output interface to the target;
      a memory suitable for storing electronic data, the memory including a program of instructions; and
      a controller communicatively coupled to the first data transfer route, the second data transfer route, the third data transfer route and the memory, the controller suitable for performing the program of instructions, wherein the program of instructions configures the controller to transfer data between the host and target utilizing the third data transfer route should the second data transfer route become unavailable, utilization of the third data transfer unaffecting operation of the host and wherein a logical identifier is utilized to access the apparatus by the host, the logical identifier being a 16-bit value configured from a bus field and an id field, the logical identifier remaining static when the third transfer route is utilized.

9. The system as described in claim 8, wherein the host, when confronted with multiple routes to a target, views the multiple routes as multiple targets.

10. The system as described in claim 8, wherein the logical identifier is included in a logical identifier table.

11. The system as described in claim 8, wherein the logical identifier is associated with a target routing table, the target routing table including a target routing entry indicating a data transfer route between the target and the input/output interface.

12. The system as described in claim 11, wherein the route includes at least one of world wide node name and world wide port name.

13. The system as described in claim 11, wherein the target routing entry includes a physical address of the target.

14. The system as described in claim 8, wherein the input/output interface is communicatively coupled to the target over at least one of a loop and fabric.

15. A method for providing a failover function between a host and a target in a network environment by an input/output interface, comprising:
providing a logical identifier table by an input/output interface, the logical identifier table including at least one logical identifier, the logical identifier suitable for referencing at least one physical address identifier of a target, the logical identifier being a 16-bit value configured from a bus field and an id field; and
managing communications between the host and the target by the input/output interface, the communications occurring over at least one of a first route and a second route of at least two routes communicatively coupling the input/output interface to the target so that the host transfers data utilizing the second route of the at least two routes should the first route of the at least two routes become unavailable, utilization of the second route unaffecting operation of the host, the logical identifier remaining static when the second route is utilized.

16. The method as described in claim 15, wherein the logical identifier is associated with the physical address identifier included in a target routing table.

17. The method as described in claim 16, wherein the physical address identifier includes at least one of world wide node name and world wide port name.

18. The method as described in claim 15, wherein the input/output interface is communicatively coupled to the target over at least one of a loop and fabric.

19. The method as described in claim 15, wherein the input/output interface includes a controller, the controller suitable for managing the communications.

20. A system for providing failover function between a host and a target in a network environment by an input/output interface, comprising:
a means for providing a logical identifier table by an input/output interface, the logical identifier table including at least one logical identifier, the logical identifier suitable for referencing at least one physical address identifier of a target, the logical identifier being a 16-bit value configured from a bus field and an id field; and
a means for managing communications between the host and the target by the input/output interface, the communications occurring over at least one of a first route and a second route of at least two routes communicatively coupling the input/output interface to the target so that the host transfers data utilizing the second route of the at least two routes should the first route of the at least two routes become unavailable, utilization of the second route unaffecting operation of the host, the logical identifier remaining static when the second route is utilized.

21. The apparatus as described in claim 1, wherein the logical identifier is configured by shifting the bus field a number of shifts based upon a number of ids per bus supported by the host.

22. The system as described in claim 8, wherein the logical identifier is configured by shifting the bus field a number of shifts based upon a number of ids per bus supported by the host.

23. The method as described in claim 15, wherein the logical identifier is configured by shifting the bus field a number of shifts based upon a number of ids per bus supported by the host.

24. The system as described in claim 20, wherein the logical identifier is configured by shifting the bus field a number of shifts based upon a number of ids per bus supported by the host.

* * * * *